United States Patent
Bae et al.

(10) Patent No.: US 12,519,579 B2
(45) Date of Patent: Jan. 6, 2026

(54) METHOD AND USER EQUIPMENT FOR TRANSMITTING HARQ-ACK INFORMATION, AND BASE STATION FOR RECEIVING HARQ-ACK INFORMATION

(71) Applicant: LG ELECTRONICS INC., Seoul (KR)

(72) Inventors: Duckhyun Bae, Seoul (KR); Suckchel Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 531 days.

(21) Appl. No.: 18/047,404

(22) Filed: Oct. 18, 2022

(65) Prior Publication Data

US 2023/0224100 A1    Jul. 13, 2023

(30) Foreign Application Priority Data

Jan. 10, 2022    (KR) ........................ 10-2022-0003631

(51) Int. Cl.

| | |
|---|---|
| *H04W 72/00* | (2023.01) |
| *H04L 1/00* | (2006.01) |
| *H04L 1/1812* | (2023.01) |
| *H04L 1/1867* | (2023.01) |
| *H04L 5/00* | (2006.01) |
| *H04W 72/11* | (2023.01) |
| *H04W 72/21* | (2023.01) |
| *H04W 72/232* | (2023.01) |

(52) U.S. Cl.
CPC .......... *H04L 1/1887* (2013.01); *H04L 1/1812* (2013.01); *H04L 5/0055* (2013.01); *H04W 72/11* (2023.01); *H04W 72/21* (2023.01); *H04W 72/232* (2023.01)

(58) Field of Classification Search
None
See application file for complete search history.

(56) References Cited

PUBLICATIONS

3GPP TSG-RAN WG1 Meeting#107-e, R1-2112758 e-Meeting, Nov. 11-19, 2021.*
European Patent Office Application Serial No. 22203043.9, Search Report dated Jan. 24, 2023, 8 pages.
Moderator (Nokia), "Final moderator summary on HARQ-ACK feedback enhancements for NR Rel-17 URLLC/IoT," 3GPP TSG-RAN WG1 Meeting #107-e, e-Meeting, R1-2112758, Nov. 2021, 249 pages.
Ericsson, "HARD-ACK Enhancements for IIoT/URLLC," 3GPP Tsg-Ran WG1 Meeting #107-e, e-Meeting, R1-2111188, Nov. 2021, 30 pages.

* cited by examiner

*Primary Examiner* — Abdelillah Elmejjarmi
(74) *Attorney, Agent, or Firm* — LEE, HONG, DEGERMAN, KANG & WAIMEY

(57) ABSTRACT

A UE may determine a target slot for HARQ deferral for transmission of first HARQ-ACK information, based on transmission of the first HARQ-ACK information overlapping with a downlink symbol in a first slot, transmit a second HARQ-ACK codebook including a first HARQ-ACK codebook in a second slot for retransmission of the first HARQ-ACK codebook, based on DCI triggering retransmission of the first HARQ-ACK codebook scheduled to be transmitted in the first slot, and transmit uplink control information in the target slot. The uplink control information does not include the first HARQ-ACK information, based on the second HARQ-ACK codebook including the first HARQ-ACK information.

12 Claims, 15 Drawing Sheets

METHOD AND USER EQUIPMENT FOR TRANSMITTING HARQ-ACK INFORMATION, AND BASE STATION FOR RECEIVING HARQ-ACK INFORMATION

CROSS-REFERENCE TO RELATED APPLICATION(S)

Pursuant to 35 U.S.C. § 119(a), this application claims the benefit of earlier filing date and right of priority to Korean Patent Application No. 10-2022-0003631, filed on Jan. 10, 2022, the contents of which is hereby incorporated by reference herein in its entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

In addition, an efficient HARQ feedback scheme considering a time division duplex (TDD) related operation, semi-static scheduling, prioritization, etc. is required.

In addition, considering that cancellation of HARQ-ACK response transmission or inappropriate transmission of a HARQ-ACK response to a BS causes PDSCH retransmission, a method to transmit, to the BS, the HARQ-ACK response, transmission of which is cancelled or is not appropriately performed, is required.

In addition, when transmission of HARQ-ACK information by HARQ deferral overlaps in time with transmission of HARQ-ACK information by retransmission of a HARQ-ACK codebook, a method to process these transmissions is required.

In addition, when HARQ deferral and HARQ-ACK codebook retransmission are performed together, a method to prevent HARQ-ACK information from being redundantly provided to the BS is required.

The objects to be achieved with the present disclosure are not limited to what has been particularly described hereinabove and other objects not described herein will be more clearly understood by persons skilled in the art from the following detailed description.

SUMMARY

In an aspect of the present disclosure, a method of transmitting hybrid automatic repeat request (HARQ)-acknowledgement (ACK) (HARQ-ACK) information by a user equipment (UE) in a wireless communication system is provided. The method includes: determining to perform HARQ deferral for transmission of first HARQ-ACK information, based on transmission of the first HARQ-ACK information overlapping with a downlink symbol in a first slot; determining a target slot in which transmission of the first HARQ-ACK information is to be deferred by the HARQ deferral; receiving downlink control information triggering retransmission of a first HARQ-ACK codebook scheduled to be transmitted in the first slot; determining a second slot for retransmission of the first HARQ-ACK codebook based on the downlink control information; transmitting a second HARQ-ACK codebook including the first HARQ-ACK codebook in the second slot; and transmitting uplink control information in the target slot. The uplink control information does not include the first HARQ-ACK information, based on the second HARQ-ACK codebook including the first HARQ-ACK information.

In another aspect of the present disclosure, a user equipment (UE) for transmitting hybrid automatic repeat request (HARQ)-acknowledgement (ACK) (HARQ-ACK) information in a wireless communication system is provided. The UE includes: at least one transceiver; at least one processor; and at least one computer memory operably connectable to the at least one processor and configured to store instructions that, when executed, cause the at least one processor to perform operations. The operations include: determining to perform HARQ deferral for transmission of first HARQ-ACK information, based on transmission of the first HARQ-ACK information overlapping with a downlink symbol in a first slot; determining a target slot in which transmission of the first HARQ-ACK information is to be deferred by the HARQ deferral; receiving downlink control information triggering retransmission of a first HARQ-ACK codebook scheduled to be transmitted in the first slot; determining a second slot for retransmission of the first HARQ-ACK codebook based on the downlink control information; transmitting a second HARQ-ACK codebook including the first HARQ-ACK codebook in the second slot; and transmitting uplink control information in the target slot. The uplink control information does not include the first HARQ-ACK information, based on the second HARQ-ACK codebook including the first HARQ-ACK information.

In another aspect of the present disclosure, a processing device in a wireless communication system is provided. The processing device includes: at least one processor; and at least one computer memory operably connectable to the at least one processor and configured to store instructions that, when executed, cause the at least one processor to perform operations. The operations include: determining to perform hybrid automatic repeat request (HARQ) deferral for transmission of first HARQ-acknowledgement (ACK) (HARQ-ACK) information, based on transmission of the first HARQ-ACK information overlapping with a downlink symbol in a first slot; determining a target slot in which transmission of the first HARQ-ACK information is to be deferred by the HARQ deferral; receiving downlink control information triggering retransmission of a first HARQ-ACK codebook scheduled to be transmitted in the first slot; determining a second slot for retransmission of the first HARQ-ACK codebook based on the downlink control information; transmitting a second HARQ-ACK codebook including the first HARQ-ACK codebook in the second slot; and transmitting uplink control information in the target slot. The uplink control information does not include the first HARQ-ACK information, based on the second HARQ-ACK codebook including the first HARQ-ACK information.

In another aspect of the present disclosure, a computer-readable storage medium is provided. The computer-readable storage medium storing at least one computer program including instructions that, when executed by at least one processor, cause the at least one processor to perform operations. The operations include: determining to perform hybrid automatic repeat request (HARQ) deferral for transmission of first HARQ-acknowledgement (ACK) (HARQ-ACK) information, based on transmission of the first HARQ-ACK information overlapping with a downlink symbol in a first slot; determining a target slot in which transmission of the first HARQ-ACK information is to be deferred by the HARQ deferral; receiving downlink control information triggering retransmission of a first HARQ-ACK codebook scheduled to be transmitted in the first slot; determining a second slot for retransmission of the first HARQ-ACK codebook based on the downlink control information; transmitting a second HARQ-ACK codebook including the first HARQ-ACK codebook in the second slot; and transmitting uplink control information in the target slot. The uplink control information does not include the first HARQ-ACK information, based on the second HARQ-ACK codebook including the first HARQ-ACK information.

In another aspect of the present disclosure, a computer program stored in a computer-readable storage medium is provided. The computer program includes at one program code including instructions that, when executed, cause at least one processor to perform operations. The operations include: determining to perform hybrid automatic repeat request (HARQ) deferral for transmission of first HARQ-acknowledgement (ACK) (HARQ-ACK) information, based on transmission of the first HARQ-ACK information overlapping with a downlink symbol in a first slot; determining a target slot in which transmission of the first HARQ-ACK information is to be deferred by the HARQ deferral; receiving downlink control information triggering retransmission of a first HARQ-ACK codebook scheduled to be transmitted in the first slot; determining a second slot for retransmission of the first HARQ-ACK codebook based on the downlink control information; transmitting a second HARQ-ACK codebook including the first HARQ-ACK codebook in the second slot; and transmitting uplink control information in the target slot. The uplink control information does not include the first HARQ-ACK information, based on the second HARQ-ACK codebook including the first HARQ-ACK information.

In another aspect of the present disclosure, a method of receiving hybrid automatic repeat request (HARQ)-acknowledgement (ACK) (HARQ-ACK) information by a base station (BS) from a user equipment (UE) in a wireless communication system is provided. The method includes: determining that HARQ deferral for transmission of first HARQ-ACK information is performed, based on transmission of the first HARQ-ACK information overlapping with a downlink symbol in a first slot; determining a target slot in which transmission of the first HARQ-ACK information is to be deferred by the HARQ deferral; transmitting downlink control information triggering retransmission of a first HARQ-ACK codebook scheduled to be transmitted in the first slot to the UE; determining a second slot for retransmission of the first HARQ-ACK codebook based on the downlink control information; receiving a second HARQ-ACK codebook including the first HARQ-ACK codebook in the second slot from the UE; and receiving uplink control information in the target slot from the UE. The uplink control information does not include the first HARQ-ACK information, based on the second HARQ-ACK codebook including the first HARQ-ACK information.

In another aspect of the present disclosure, a base station (BS) for receiving hybrid automatic repeat request (HARQ)-acknowledgement (ACK) (HARQ-ACK) information from a user equipment (UE) in a wireless communication system is provided. The BS includes: at least one transceiver; at least one processor; and at least one computer memory operably connected to the at least one processor and configured to store instructions that, when executed, cause the at least one processor to perform operations. The operations include: determining that HARQ deferral for transmission of first HARQ-ACK information is performed, based on transmission of the first HARQ-ACK information overlapping with a downlink symbol in a first slot; determining a target slot in which transmission of the first HARQ-ACK information is to be deferred by the HARQ deferral; transmitting downlink control information triggering retransmission of a first HARQ-ACK codebook scheduled to be transmitted in the first slot to the UE; determining a second slot for retransmission of the first HARQ-ACK codebook based on the downlink control information; receiving a second HARQ-ACK codebook including the first HARQ-ACK codebook in the second slot from the UE; and receiving uplink control information in the target slot from the UE. The uplink control information does not include the first HARQ-ACK information, based on the second HARQ-ACK codebook including the first HARQ-ACK information.

In each aspect of the present disclosure, the method at the UE and the operations may further include: receiving an SPS configuration including a configuration regarding the HARQ deferral. The method at the BS and the operations may further include: providing a semi-persistent scheduling (SPS) configuration including a configuration regarding the HARQ deferral to the UE.

In each aspect of the present disclosure, the first HARQ-ACK information may be HARQ-ACK information for an SPS physical downlink shared channel (PDSCH) based on an SPS configuration in which the HARQ deferral is enabled.

In each aspect of the present disclosure, the uplink control information may include second HARQ-ACK information, based on the second HARQ-ACK information, transmission of which is deferred to the target slot from a slot different from the first slot.

In each aspect of the present disclosure, the second HARQ-ACK codebook may further include the second HARQ-ACK information after the first HARQ-ACK codebook, based on the target slot being equal to the second slot.

The foregoing solutions are merely a part of the examples of the present disclosure and various examples into which the technical features of the present disclosure are incorporated may be derived and understood by persons skilled in the art from the following detailed description.

According to some implementations of the present disclosure, a wireless communication signal may be efficiently transmitted/received. Accordingly, the total throughput of a wireless communication system may be raised.

According to some implementations of the present disclosure, various services with different requirements may be efficiently supported in a wireless communication system.

According to some implementations of the present disclosure, delay/latency generated during radio communication between communication devices may be reduced.

According to some implementation(s) of the present disclosure, HARQ-ACK information, transmission of which is cancelled or reception of which is not appropriately performed by a BS, may be provided to the BS at the request of the BS.

According to some implement(s) of the present disclosure, transmission of HARQ-ACK information by HARQ deferral and transmission of HARQ-ACK information by retransmission of a HARQ-ACK codebook may be efficiently provided to the BS together or separately.

According to some implement(s) of the present disclosure, signaling overhead related to HARQ-ACK transmission may be reduced.

According to some implement(s) of the present disclosure, when HARQ deferral and HARQ-ACK retransmission are performed together, the same HARQ-ACK information may be easily prevented from being redundantly provided to the BS.

The effects according to the present disclosure are not limited to what has been particularly described hereinabove and other effects not described herein will be more clearly understood by persons skilled in the art related to the present disclosure from the following detailed description.

BRIEF DESCRIPTION OF DRAWINGS

The accompanying drawings, which are included to provide a further understanding of the present disclosure, illustrate examples of implementations of the present disclosure and together with the detailed description serve to explain implementations of the present disclosure.

DETAILED DESCRIPTION

Figure 1:
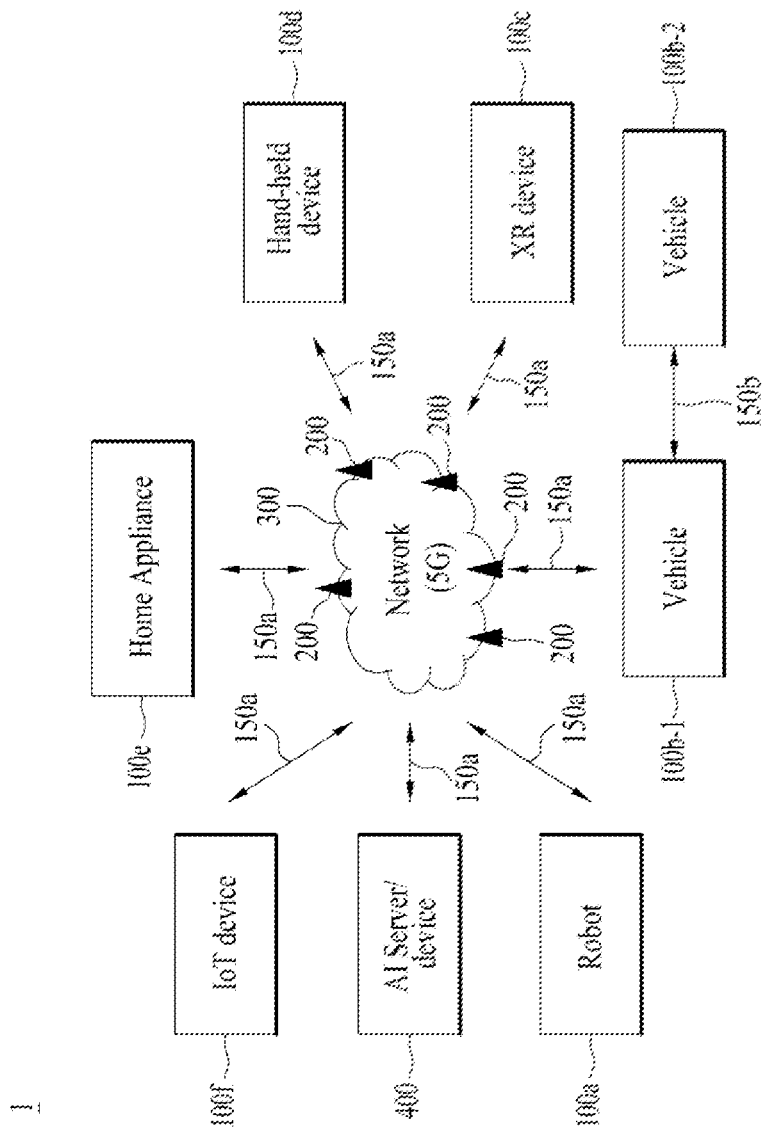
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term special cell (SpCell) refers to the Pcell of a master cell group (MCG) or the primary secondary cell (PSCell) of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a primary secondary cell (PSCell) and 0 or more Scells. PSCell is a primary Scell of an SCG. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group (also referred to as a primary PUCCH group), which includes the Pcell and 0 or more Scells, and an Scell PUCCH group (also referred to as a secondary PUCCH group), which includes only Scell(s). For the Scells, an Scell on which a PUCCH associated with the corresponding cell is transmitted (hereinafter, PUCCH Scell) may be configured. An Scell through which the PUCCH Scell is indicated belongs to an Scell PUCCH group (i.e., secondary PUCCH group) and PUCCH transmission of related UCI is performed on the PUCCH Scell. An Scell for which the PUCCH Scell is not indicated or a cell indicated as a PUCCH transmission cell is a Pcell belongs to the Pcell PUCCH group (i.e., primary PUCCH group) and PUCCH transmission of related UCI is performed on the Pcell. Hereinafter, if the UE is configured with an SCG and some implementations of the present disclosure related to a PUCCH are applied to the SCG, the primary cell may refer to a PSCell of the SCG. If the UE is configured with the PUCCH Scell and some implementations of the present disclosure related to the PUCCH are applied to the secondary PUCCH group, a primary cell may refer to the PUCCH Scell of the secondary PUCCH group.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., resource elements (REs)) that carry downlink control information (DCI), and the PDSCH refers to a set of time-frequency resources that carry DL data. The PUCCH, PUSCH, and PRACH refer to a set of time-frequency resources that is a set of time-frequency that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In this specification, a radio resource (e.g., a time-frequency resource) scheduled or configured to the UE by the BS for transmission or reception of the PUCCH/PUSCH/PDSCH may be referred to as a PUCCH/PUSCH/PDSCH resource.

Since a communication device receives an SS/PBCH resource block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, reception of physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
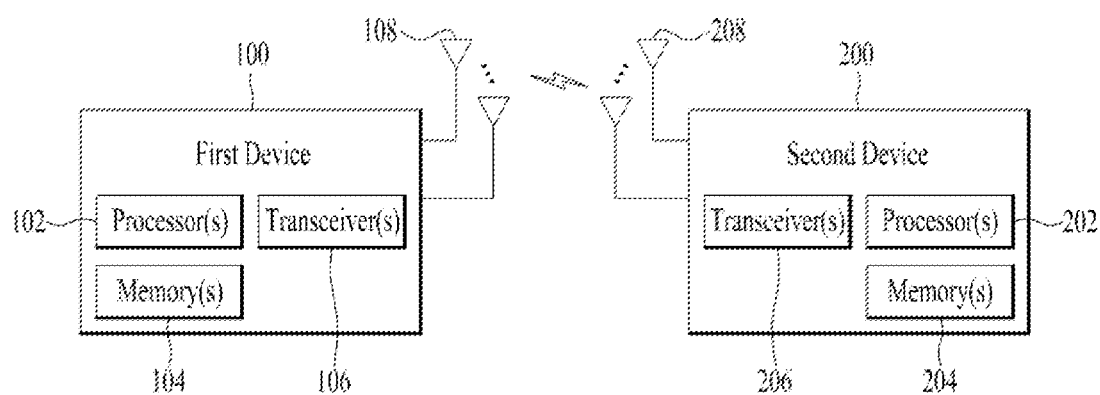
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s)

106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technology implemented in the wireless devices XXX and YYY of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices XXX and YYY of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
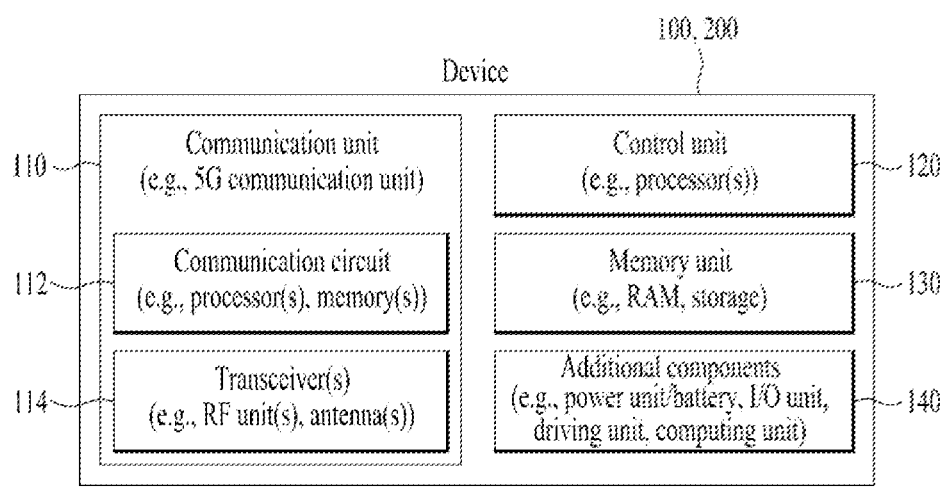
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-volatile) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-volatile) storage medium.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
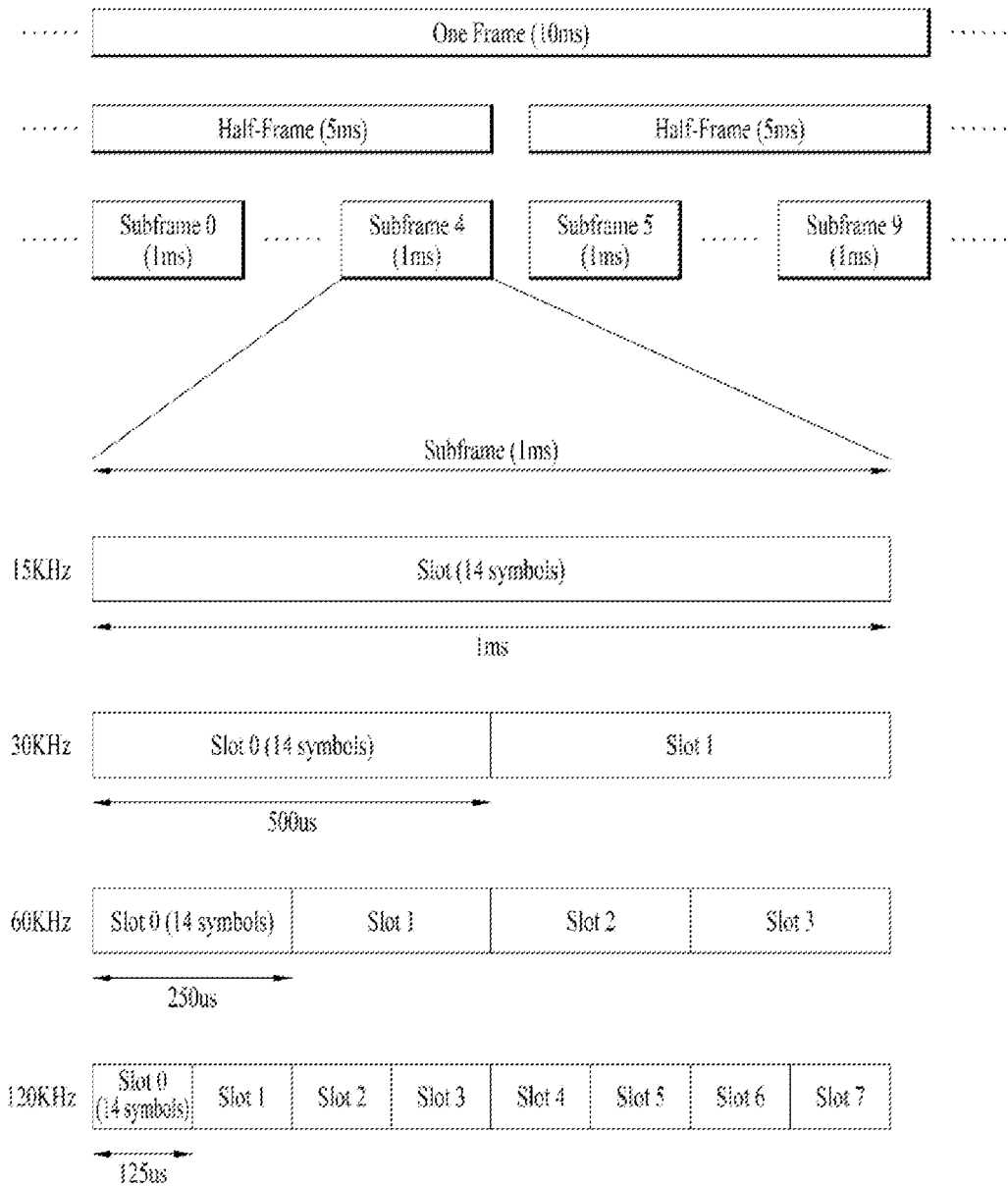
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f=(\Delta f_{max}*N_f/100)*T_c=10$ ms and is divided into two half-frames of 5 ms each. A basic time unit for NR is $T_c=1/(\Delta f_{max}*N_f)$ where $\Delta f_{max}=480*10^3$ Hz and $N_f=4096$. For reference, a basic time unit for LTE is $T_s=1/(\Delta f_{ref}*N_{f,ref})$ where $\Delta f_{ref}=15*10^3$ Hz and $N_{f,ref}=2048$. $T_c$ and $T_f$ have the relationship of a constant $\kappa=T_s/T_c=64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f=2^u*15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

For a subcarrier spacing configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{frame,u}_{slot}-1\}$.

Figure 5:
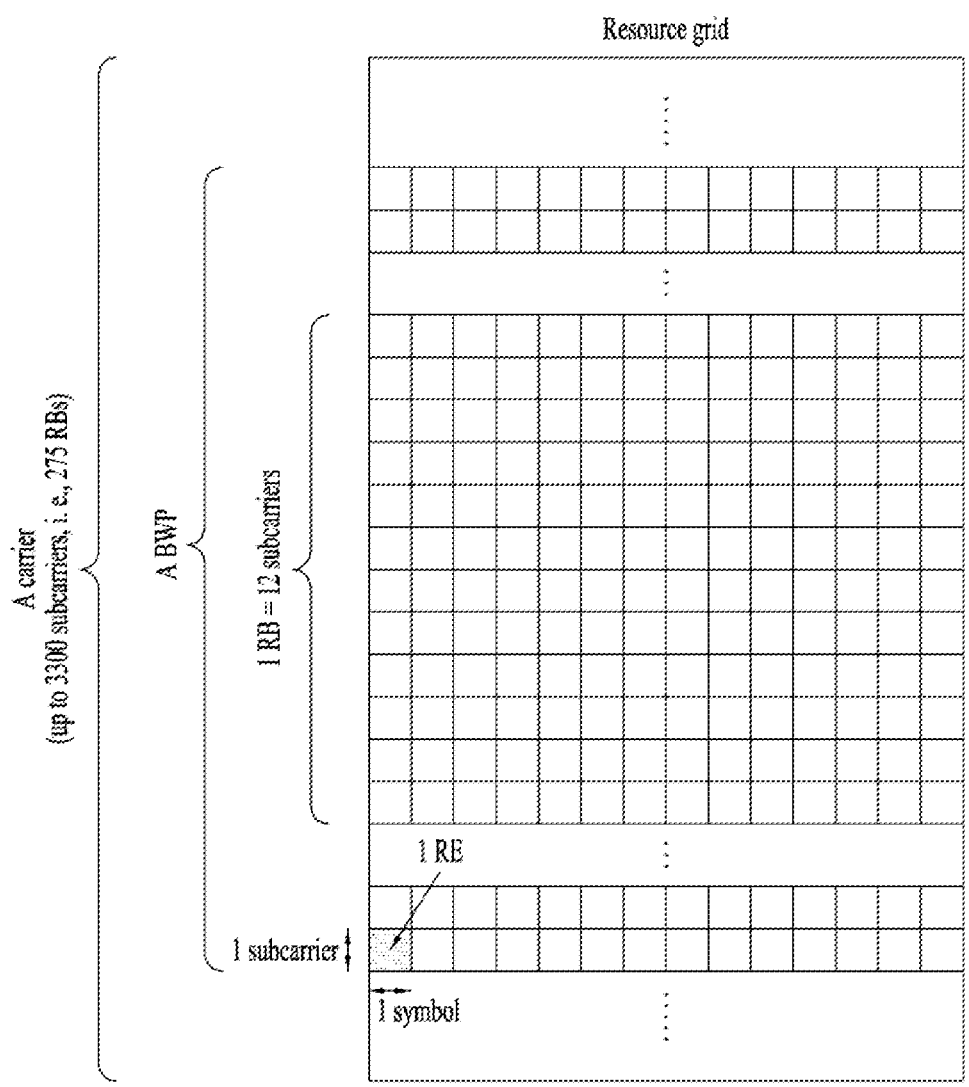
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB nucRB is given by: $n^u_{PRB}=n^u_{PRB}+N^{size,u}_{BWP,i}$, where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided the following parameters for the serving cell: i) an SCS; ii) a CP; iii) a CRB $N^{start}_{BWP}=O_{carrier}+RB_{start}$ and the number of contiguous RBs $N^{size}_{BWP}=L_{RB}$ provided by an RRC parameter locationAndBandwidth, which indicates an offset $RB_{set}$ and a length $L_{RB}$ as a resource indicator value (RIV) on the assumption of $N^{start}_{BWP}=275$, and a value $O_{carrier}$ provided by an RRC parameter offsetToCarrier for the SCS; an index in the set of DL BWPs or UL BWPs; a set of BWP-common parameters; and a set of BWP-dedicated parameters.

Virtual resource blocks (VRBs) may be defined within the BWP and indexed from 0 to $N^{size,\mu}_{BWP,i}-1$, where i denotes a BWP number. The VRBs may be mapped to PRBs according to non-interleaved mapping. In some implementations, VRB n may be mapped to PRB n for non-interleaved VRB-to-PRB mapping.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

Figure 6:
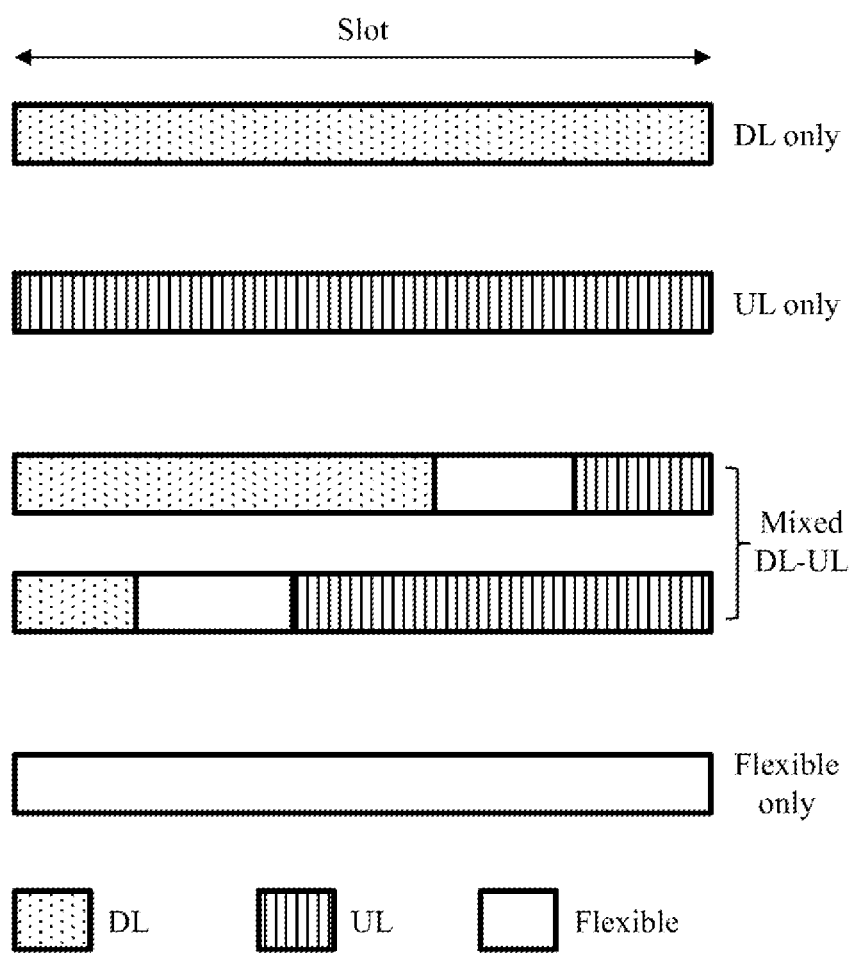
FIG. 6 illustrates slot structures used in a 3GPP-based system.

FIG. 6 illustrates slot structures used in a 3GPP-based system. In all 3GPP-based systems, for example, in an NR system, each slot may have a self-contained structure including i) a DL control channel, ii) DL or UL data, and/or iii) a UL control channel. For example, the first N symbols in a slot may be used to transmit the DL control channel (hereinafter, DL control region) and the last M symbols in a slot may be used to transmit the UL control channel (hereinafter, UL control region), where N and M are integers other than negative numbers. A resource region (hereinafter, data region) between the DL control region and the UL control region may be used to transmit DL data or UL data. Symbols in a single slot may be divided into group(s) of consecutive symbols that may be used as DL symbols, UL symbols, or flexible symbols. Hereinbelow, information indicating how each symbol in slot(s) is used will be referred to as a slot format. For example, which symbols in slot(s) are used for UL and which symbols in slot(s) are used for DL may be defined by a slot format.

When a BS intends to operate a serving cell in time division duplex (TDD) mode, the BS may configure a pattern for UL and DL allocation for the serving cell through higher layer (e.g., RRC) signaling. For example, the following parameters may be used to configure a TDD DL-UL pattern:

dl-UL-TransmissionPeriodicity that provides a periodicity of the DL-UL pattern;
nrofDownlinkSlots that provides the number of consecutive full DL slots at the beginning of each DL-UL pattern, where the full DL slots are slots having only DL symbols;
nrofDownlinkSymbols that provides the number of consecutive DL symbols at the beginning of a slot immediately following the last full DL slot;
nrofUplinkSlots that provides the number of consecutive full UL slots at the end of each DL-UL pattern, where the full UL slots are slots having only UL symbols; and
nrofUplinkSymbols that provides the number of consecutive UL symbols in the end of a slot immediately preceding the first full UL slot.

The remaining symbols that are not configured as either DL symbols or UL symbols among symbols in the DL-UL pattern are flexible symbols.

If the UE is provided with a configuration for the TDD DL-UL pattern, i.e., a TDD UL-DL configuration (e.g., tdd-UL-DL-ConfigurationCommon, or tdd-UL-DLConfigurationDedicated), through higher layer signaling, the UE sets a slot format per slot over a number of slots based on the configuration.

For symbols, although there may be various combinations of DL symbols, UL symbols, and flexible symbols, a predetermined number of combinations may be predefined as slot formats and the predefined slot formats may be respectively identified by slot format indexes. The following table shows a part of the predefined slot formats. In the table below, D denotes a DL symbol, U denotes a UL symbol, and F denotes a flexible symbol.

TABLE 3

| | Symbol slumber in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | F | F | F | F | F |
| 7 | D | D | D | D | D | D | D | F | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| ... | | | | | | ... | | | | | | | | |

To indicate which slot format is used in a specific slot among the predefined slot formats, the BS may configure a set of slot format combinations applicable to a corresponding serving cell per cell with respect to a set of serving cells through higher layer (e.g., RRC) signaling and cause the UE to monitor a group-common PDCCH for slot format indicator(s) (SFI(s)) through higher layer (e.g., RRC) signaling. Hereinafter, DCI carried by the group-common PDCCH for the SFI(s) will be referred to as SFI DCI. DCI format 2_0 is used as the SFI DCI. For example, for each serving cell in a set of serving cells, the BS may provide the UE with the (start) position of a slot format combination ID (i.e., SFI-index) for a corresponding serving cell in the SFI DCI, a set of slot format combinations applicable to the serving cell, and a reference subcarrier spacing configuration for each slot format in a slot format combination indicated by an SFI-index value in the SFI DCI. One or more slot formats are configured for each slot format combination in the set of the slot format combinations and the slot format combination ID (i.e., SFI-index) is assigned to the slot format combination. For example, when the BS intends to configure the slot format combination with N slot formats, N slot format indexes among slot format indexes for the predefined slot formats (e.g., see Table 3) may be indicated for the slot format combination. In order to configure the UE to monitor the group-common PDCCH for the SFIs, the BS informs the UE of an SFI-RNTI corresponding to an radio network temporary identifier (RNTI) used for an SFI and the total length of a DCI payload having CRC scrambled with the SFI-RNTI. Upon detecting the PDCCH based on the SFI-RNTI, the UE may determine slot format(s) for the corresponding serving cell from an SFI-index for the serving cell among SFI-indexes in the DCI payload in the PDCCH.

Symbols indicated as flexible symbols by the TDD DL-UL pattern configuration may be indicated as UL symbols, DL symbols, or flexible symbols by the SFI DCI. Symbols indicated as the DL/UL symbols by the TDD DL-UL pattern configuration are not overridden as the UL/DL symbols or the flexible symbols by the SFI DCI.

If the TDD DL-UL pattern is not configured, the UE determines whether each slot is used for UL or DL and determines symbol allocation in each slot based on the SFI DCI and/or on DCI for scheduling or triggering DL or UL signal transmission (e.g., DCI format 1_0, DCI format 1_1, DCI format 1_2, DCI format 0_0, DCI format 0_1, DCI format 0_2, or DCI format 2_3).

NR frequency bands are defined as two types of frequency ranges, i.e., FR1 and FR2. FR2 is also referred to as millimeter wave (mmW). The following table shows frequency ranges within which NR may operate.

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including resource allocation information on the DL-SCH is called PDSCH scheduling DCI, and DCI including resource allocation information on the UL-SCH is called PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH is a physical layer UL channel for uplink control information (UCI) transmission. The PUCCH carries UCI. UCI types transmitted on the PUCCH include hybrid automatic repeat request acknowledgement (HARQ-ACK) information, a scheduling request (SR), and channel state information (CSI). UCI bits include HARQ-ACK information bits if present, SR information bits if present, link recovery request (LRR) information bits if present, and CSI bits if present. In the present disclosure, HARQ-ACK information bits correspond to a HARQ-ACK codebook. In particular, a bit sequence in which HARQ-ACK information bits are arranged according to a predetermined rule is called a HARQ-ACK codebook.

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (LI). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

Link recovery request (LRR)

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 5.

(0) PUCCH format 0 (PF0 or F0)
  Supported UCI payload size: up to K bits (e.g., K=2)
  Number of OFDM symbols constituting a single PUCCH: 1 to X symbols (e.g., X=2)
  Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.
  Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)
  Supported UCI payload size: up to K bits (e.g., K=2)
  Number of OFDM symbols constituting a single PUCCH: Y to Z symbols (e.g., Y=4 and Z=14)
  Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.
  Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)
  Supported UCI payload size: more than K bits (e.g., K=2)
  Number of OFDM symbols constituting a single PUCCH: 1 to X symbols (e.g., X=2)
  Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.
  Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)
  Supported UCI payload size: more than K bits (e.g., K=2)
  Number of OFDM symbols constituting a single PUCCH: Y to Z symbols (e.g., Y=4 and Z=14)
  Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).
  Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)
  Supported UCI payload size: more than K bits (e.g., K=2)
  Number of OFDM symbols constituting a single PUCCH: Y to Z symbols (e.g., Y=4 and Z=14)
  Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.
  Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 5

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2

PUCCH resource set #1, if 2<the number of UCI bits=<$N_1$

PUCCH resource set #(K−1), if $N_{K-2}$<the number of UCI bits=<$N_{K-1}$

Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 6).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting control channel element (CCE) index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

Resource Allocation by PDCCH: Dynamic Grant/Assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. HARQ information on a DL-SCH or UL-SCH may include a new information indicator (NDI), transport block size (TBS), redundancy version (RV), and HARQ process ID (i.e., HARQ process number). The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 7:
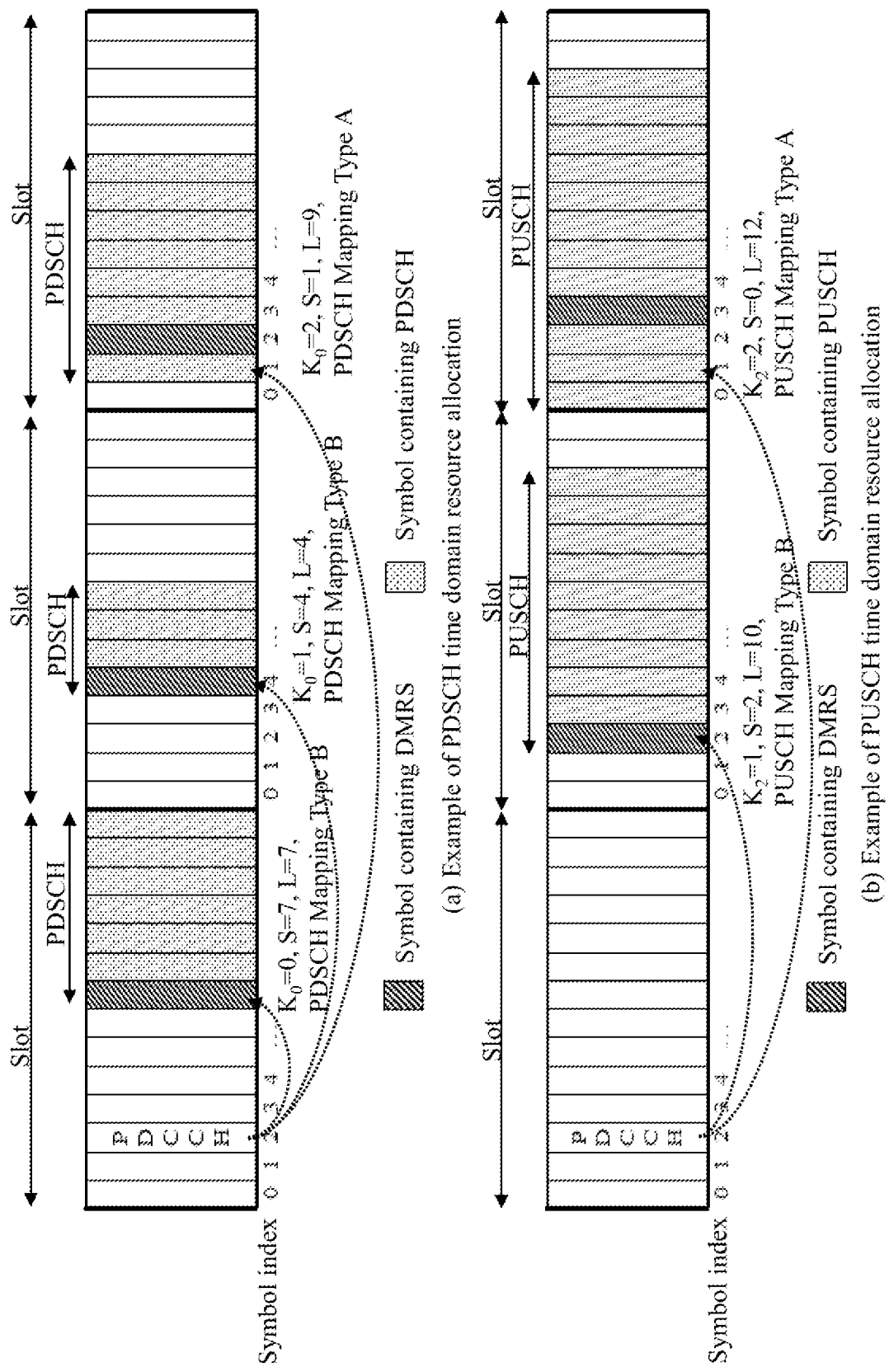
FIG. 7 illustrates an example of physical downlink shared channel (PDSCH) time domain resource assignment (TDRA) caused by a physical downlink control channel (PDCCH) and an example of physical uplink shared channel (PUSCH) TDRA caused by the PDCCH.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. There are two PDSCH/PUSCH mapping types: one is mapping type A and the other is mapping type B. In the case of PDSCH/PUSCH mapping type A, a DMRS is mapped to a PDSCH/PUSCH resource with respect to the start of a slot. One or two of the symbols of the PDSCH/PUSCH resource may be used as DMRS symbol(s) according to other DMRS parameters. For example, in the case of PDSCH/PUSCH mapping type A, the DMRS is located in the third symbol (symbol #2) or the fourth symbol (symbol #3) in the slot according to RRC signaling. In the case of PDSCH/PUSCH mapping type B, a DMRS is mapped with respect to the first OFDM symbol of a PDSCH/PUSCH resource. One or two symbols from the first symbol of the PDSCH/PUSCH resource may be used as DMRS symbol(s) according to other DMRS parameters. For example, in the case of PDSCH/PUSCH mapping type B, the DMRS is located at the first symbol allocated for the PDSCH/PUSCH. In the present disclosure, the PDSCH/PUSCH mapping type may be referred to as a mapping type or a DMRS mapping type. For example, in this specification, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:
cs-RNTI corresponding to a CS-RNTI for retransmission;
periodicity corresponding to a periodicity of configured grant Type 1;
timeDomainOffset indicating an offset of a resource with respect to system frame number (SFN)=0 in the time domain;
timeDomainAllocation value m that provides a row index m+1 pointing to the allocation table, indicating a combination of the start symbol S, the length L, and the PUSCH mapping type;
frequencyDomainAllocation that provides frequency domain resource allocation; and
mcsAndTBS that provides IMCS indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+ N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:
cs-RNTI corresponding to a CS-RNTI for activation, deactivation, and retransmission; and
periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying:
[(SFN*numberOfSlotsPerFrame*numberOfSymbolsPer Slot)+(slot number in the frame*numberOfSymbolsPerSlot)+symbol number in the slot]=[(SFN$_{start\ time}$*numberOfSlotsPerFrame*numberOfSymbolsPerSlot+ slot$_{start\ time}$*numberOfSymbolsPerSlot+symbol$_{start\ time}$)+ N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset and/or a parameter harq-ProcID-Offset2 used to derive HARQ process IDs for configured UL grants may be further provided by the BS to the UE. harq-ProcID-Offset is an offset of a HARQ process for a configured grant for operation with shared spectrum channel access, and harq-ProcID-Offset2 is an offset of a HARQ process for a configured grant. In the present disclosure, cg-RetransmissionTimer is a duration after (re)transmission based on a configured grant in which the UE should not autonomously perform retransmission based on the HARQ process of the (re)transmission. cg-RetransmissionTimer may be provided to the UE by the BS when retransmission on a configured UL grant is configured. For configured grants configured with neither harq-ProcID-Offset nor cg-RetransmissionTimer, the HARQ process ID associated with the first symbol of UL transmission may be derived from the following equation: HARQ Process ID= [floor(CURRENT_symbol/periodicity)] modulo nrofHARQ-Processes. For configured UL grants with harq-ProcID-Offset2, the HARQ process ID associated with the first symbol of UL transmission may be derived from the following equation: HARQ Process ID=[floor(CURRENT_symbol/periodicity)] modulo nrofHARQ-Processes+harq-ProcID-Offset2, where CURRENT_symbol= (SFN*numberOfSlotsPerFrame*numberOfSymbolsPerSlot+ slot number in the frame*numberOfSymbolsPerSlot+ symbol number in the slot), and numberOfSlotsPerFrame and numberOfSymbolsPerSlot denote the number of consecutive slots per frame and the number of consecutive OFDM symbols per slot, respectively. For configured UL grants with cg-RetransmissionTimer, the UE may select a HARQ process ID from among HARQ process IDs available for the configured grant configuration.

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling used to configure a semi-persistent transmission:
  cs-RNTI corresponding to a CS-RNTI for activation, deactivation, and retransmission;
  nrofHARQ-Processes that provides the number of HARQ processes for SPS;
  periodicity that provides a periodicity of configured DL assignment for SPS;
  n1PUCCH-AN that provides a HARQ resource for a PUCCH for SPS (the network configures the HARQ resource as format 0 or format 1, and the actual PUCCH resource is configured by PUCCH-Config and referred to in n1PUCCH-AN by the ID thereof).

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFN$_{start\ time}$+ slot$_{start\ time}$)+N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset used to derive HARQ process IDs for configured DL assignments may be further provided by the BS to the UE. harq-ProcID-Offset is an offset of a HARQ process for SPS. For configured DL assignments without harq-ProcID-Offset, a HARQ process ID associated with a slot in which DL transmission starts may be determined from the following equation: HARQ Process ID=[floor (CURRENT_slot*10/ (numberOfSlotsPerFrame*periodicity))] modulo nrofHARQ-Processes, where CURRENT_slot= [(SFN*numberOfSlotsPerFrame)+slot number in the frame], and numberOfSlotsPerFrame denotes the number of consecutive slots per frame. For configured DL assignments with harq-ProcID-Offset, a HARQ process ID associated with a slot in which DL transmission starts may be determined from the following equation: HARQ Process ID= [floor (CURRENT_slot/periodicity)] modulo nrofHARQ-Processes+harq-ProcID-Offset, where CURRENT_slot= [(SFN*numberOfSlotsPerFrame)+slot number in the frame], and numberOfSlotsPerFrame denotes the number of consecutive slots per frame.

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 7 and Table 8. Table 7 shows an example of special fields for DL SPS and UL grant Type 2 scheduling activation PDCCH validation, and Table 8 shows an example of special fields for DL SPS and UL grant Type 2 scheduling release PDCCH validation.

TABLE 6

|  | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block: set to '00' |

TABLE 7

|  | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

In the present disclosure, a PDSCH based on DL SPS may be referred to as an SPS PDSCH, and a PUSCH based on a UL configured grant (CG) may be referred to as a CG PUSCH. A PDSCH dynamically scheduled by DCI carried on a PDCCH may be referred to as a dynamic grant (DG) PDSCH, and a PUSCH dynamically scheduled by DCI carried by on a PDCCH may be referred to as a DG PUSCH.

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. A master information block (MIB) on a PBCH provides parameters (e.g., CORESET #0 configuration) for monitoring a PDCCH for scheduling a PDSCH carrying system information block 1 (SIB1) to the UE. The PBCH may also indicate that there is no associated SIB1. In this case, the UE may be provided with not only a frequency range in which the UE may assume that there is no SSB associated with SSB1 but also other frequencies to search for an SSB associated with SIB1. CORESET #0, which is a CORESET for scheduling SIB1 at least, may be configured by the MIB or dedicated RRC signaling.

A set of PDCCH candidates monitored by the UE is defined in terms of PDCCH search space sets. The search space set may be a common search space (CSS) set or a UE-specific search space (USS) set. Each CORESET configuration is associated with one or more search space sets, and each search space set is associated with one CORESET configuration. The search space set is determined based on the following parameters provided by the BS to the UE.

controlResourceSetId: an identifier for identifying a CORESET p associated with a search space set s.

monitoringSlotPeriodicityAndOffset: a PDCCH monitoring periodicity of slots $k_s$ and a PDCCH monitoring offset of $o_s$ slots to configure slots for PDCCH monitoring.

duration: a duration of $T_s < k_s$ slots indicating a number of slots in which the search space set s exists.

monitoringSymbolsWithinSlot: a PDCCH monitoring pattern within a slot, indicating first symbol(s) of the CORESET within a slot for PDCCH monitoring.

nrofCandidates: a number of PDCCH candidates per CCE aggregation level.

searchSpaceType: an indication that search space set s is either a CSS set or a USS set.

The parameter monitoringSymbolsWithinSlot may indicate the first symbol(s) for PDCCH monitoring in the slots configured for PDCCH monitoring (e.g., see monitoringSlotPeriodicityAndOffset and duration). For example, if monitoringSymbolsWithinSlot is configured with 14 bits, the most significant (left) bit represents the first OFDM symbol of a slot, and the second most significant (left) bit represents the second OFDM symbol of the slot. In this way, the bits of monitoringSymbolsWithinSlot may represent 14 OFDM symbols of the slot, respectively. For example, among the bits of monitoringSymbolsWithinSlot, bit(s) set to 1 may identify the first symbol(s) of a CORESET in a slot.

A UE monitors PDCCH candidates in PDCCH monitoring occasions only. The UE determines a monitoring occasion on an active DL BWP from the PDCCH monitoring periodicity, the PDCCH monitoring offset, and the PDCCH monitoring pattern within a slot. In some implementations, for search space set s, the UE determines that a PDCCH monitoring occasion(s) existing in a slot with number $n^u_{s,f}$ in a frame with number $n_f$ if $(n_f \cdot N^{frame,u}_{slot} + n^u_{s,f} - o_s)$ mod $k_s = 0$. The UE monitors PDCCH candidates for search space set s for $T_s$ consecutive slots, starting from slot $n^u_{s,f}$, and does not monitor PDCCH candidates for search space set s for the next $k_s - T_s$.

The following table shows search space sets, related RNTIs, and use cases thereof.

TABLE 8

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

The following table shows DCI formats carried by a PDCCH.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of PRB(s) and OFDM symbol(s) where UE cancels the corresponding UL transmission from the UE |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. For a CSS, DCI format 0_0 and DCI format 1_0 have fixed sizes after the BWP size is initially given by RRC. For a USS, DCI format 0_0 and DCI format 1_0 are fixed in size in fields other than a frequency domain resource assignment (FDRA) field, and the FDRA field may vary in size by configuration of a related parameter by the BS. In DCI format 0_1 and DCI format 1_1, the size of the DCI field may be changed by various RRC reconfigurations by the BS. DCI format 2_0 may be used to provide dynamic slot format information (e.g., SFI DCI) to the UE, DCI format 2_1 may be used to provide DL pre-emption information to the UE, and DCI format 2_4 may be used to indicate a UL resource on which the UE needs to cancel UL transmission.

A wireless communication system to which some implementations of the present disclosure are applicable (e.g., a 3GPP-based wireless communication system) supports HARQ, which is a combination of retransmission and error correction. If an error in packet transmission is detected, packet retransmission is requested and a receiver attempts to decode the packet based on previous and current transmissions. In the wireless communication system to which some implementations of the present disclosure are applicable, HARQ operates at a MAC layer and a PHY layer. HARQ is a stop-and-wait protocol which transmits no other packets while waiting for feedback on a current packet. Such a protocol results in inefficient use of radio resources due to a round trip time. The 3GPP-based wireless communication system solves this problem by allowing multiple concurrent HARQ processes. Each HARQ process may have one packet waiting for ACK. On both DL and UL, the UE may support up to a predetermined number of HARQ processes (e.g., 16 HARQ processes) per cell. Each HARQ process generally handles one TB at a time. However, if DL spatial multiplexing is configured, each HARQ process may handle two TBs at a time. For example, if the UE is configured with the maximum number of codewords that a single DCI may schedule being 1, the number of TBs associated with one HARQ process is 1. If the UE is configured with the maximum number of codewords that the single DCI may schedule being 2, the number of TBs associated with one HARQ process is 2. Upon receiving a retransmitted TB, the receiver may decode the retransmitted TB by combining the current and previous transmissions of the TB. In some scenarios, the TB may be very large. If the TB is very large, retransmission of the entire TB even when there are errors in only a few bits wastes radio resources. Therefore, in some scenarios (e.g., 5G NR), CBG-level retransmission has been introduced. When a CRC-attached TB is larger than a certain size, the CRC-attached TB is segmented into smaller units called code blocks. A CRC of each code block is attached to the code block. Since transmitting HARQ-ACK for each code block causes excessive signaling, CBG-level HARQ feedback is being considered in which 2/4/6/8 code blocks are grouped into CBGs and HARQ feedback for each CBG is transmitted. Upon receiving CBG-level HARQ feedback from the receiver, a transmitter that has transmitted a TB may retransmit only a CBG requiring retransmission to the receiver, rather than retransmitting the entire TB. A TB may have one or multiple CBGs and each CBG may have one or more code blocks. In the case of TB-level HARQ feedback, one HARQ-ACK information bit may be transmitted per TB and, in the case of CBG-level HARQ feedback, one HARQ-ACK information bit may be transmitted per CBG.

Figures 8, 9:
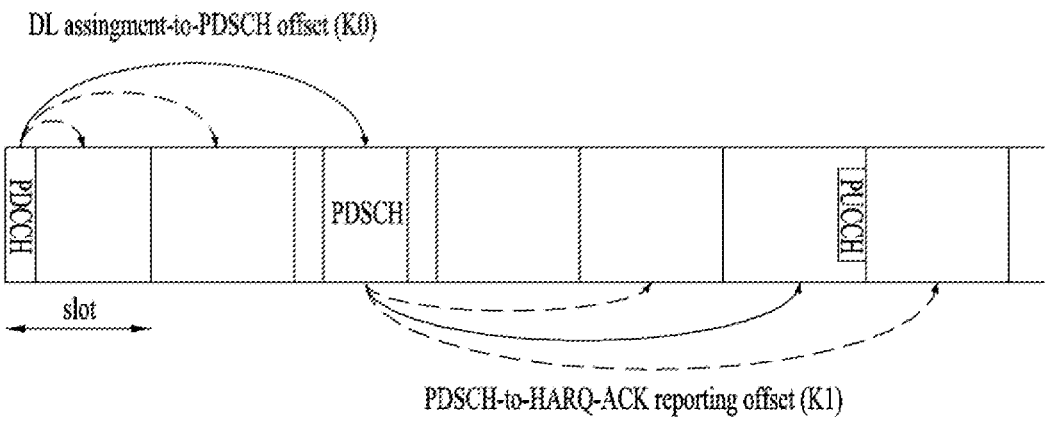
FIG. 8 illustrates a hybrid automatic repeat request-acknowledgement (HARQ-ACK) transmission/reception procedure.
FIG. 9 illustrates an example of a HARQ process-based HARQ-ACK codebook according to some implementations of the present disclosure.

FIG. 8 illustrates a HARQ-ACK transmission/reception procedure.

Referring to FIG. 8, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH. In some scenarios, PUCCH feedback based on a subslot including fewer OFDM symbols (e.g., 2 to 7 OFDM symbols) than 14 OFDM symbols as well as PUCCH feedback based on a subslot including 14 OFDM symbols may be performed.

The DCI (e.g., DCI format 1_0 or DCI format 1_1) carried by the PDCCH for scheduling the PDSCH may include the following information.

FDRA: FDRA indicates an RB set allocated to the PDSCH.
TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.
PDSCH-to-HARQ_feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as i) a semi-static HARQ-ACK codebook, ii) a dynamic HARQ-ACK codebook and iii) HARQ process based HARQ-ACK codebook, according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, the HARQ-ACK information for the PDSCH may be transmitted in slot #(m+k). As an example, k∈{1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n-k). For example, when k∈{1, 2, 3, 4, 5, 6, 7, 8}, the HARQ-ACK information of slot #n may include HARQ-ACK corresponding to slot #(n−8) to slot #(n−1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. The semi-static HARQ-ACK codebook is referred to as a Type-1 HARQ-ACK codebook. For the Type-1 HARQ-ACK codebook, the number of bits to be transmitted in a HARQ-ACK report is fixed and may be potentially large. If many cells are configured but only few cells are scheduled, the Type-1 HARQ-ACK codebook may be inefficient.

In the case of the dynamic HARQ-ACK codebook, the HARQ-ACK payload size that the UE is to report may be dynamically changed by the DCI etc. The dynamic HARQ-ACK codebook is referred to as a Type-2 HARQ-ACK codebook. The Type-2 HARQ-ACK codebook may be considered as optimized HARQ-ACK feedback because the UE sends feedback only for scheduled serving cells. However, in poor channel conditions, the UE may erroneously determine the number of scheduled serving cells. To solve this problem, a downlink assignment index (DAI) may be included as a part of DCI. For example, in the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the case of a HARQ-ACK codebook based on HARQ processes, the HARQ-ACK payload is determined based on all HARQ processes of all configured (or activated) serving cells in a PUCCH group. For example, the size of the HARQ-ACK payload to be reported by the UE using the HARQ-ACK codebook based on HARQ processes may be determined based on the number of all configured or activated serving cells in the PUCCH group configured for the UE and the number of HARQ processes for the serving cells. The HARQ-ACK codebook based on HARQ processes is also referred to as a Type-3 HARQ-ACK codebook. The type-3 HARQ-ACK codebook may be applied to one-shot feedback. For example, if the UE is provided with pdsch-HARQ-ACK-OneShotFeedback through RRC signaling and the UE detects a DCI format including a one-shot HARQ-ACK request field, a value of which is 1, at any PDCCH monitoring occasion, the UE includes HARQ-ACK information in the Type-3 HARQ-ACK codebook.

FIG. 9 illustrates an example of a HARQ process-based HARQ-ACK codebook according to some implementations of the present disclosure. In FIG. 9, "AN" denotes HARQ-ACK information and "HP" denotes a HARQ process.

Referring to FIG. 9, when the number of HARQ processes for Cell #0 is 6, the number of HARQ processes for Cell #1 is 6, and the number of HARQ processes for Cell #2 is 4, a HARQ process-based HARQ-ACK codebook (particularly, Type-3 HARQ-ACK codebook according to 3GPP TS 38.213 Rel-16) is generated to include HARQ-ACK information for each of 6 HARQ processes of Cell #0, 6 HARQ processes of Cell #1, and 4 HARQ processes of Cell #2, regardless of whether a HARQ process is associated with a dynamic PDSCH or an SPS PDSCH.

If the UE is provided with pdsch-HARQ-ACK-CodebookList through RRC signaling, the UE may be indicated by pdsch-HARQ-ACK-CodebookList to generate one or multiple HARQ-ACK codebooks. When the UE is indicated to generate one HARQ-ACK codebook, the HARQ-ACK codebook is associated with a PUCCH of priority index 0. When the UE is provided with pdsch-HARQ-ACK-CodebookList, the UE multiplexes only HARQ-ACK information associated with the same priority index with the same HARQ-ACK codebook. When the UE is indicated to generate two HARQ-ACK codebooks, the first HARQ-ACK codebook is associated with a PUCCH of priority index 0, and the second HARQ-ACK codebook is associated with a PUCCH of priority index 1.

The unit of the time difference (e.g., a PDSCH-to-HARQ_feedback timing indicator) from a DL data channel to a PUCCH for HARQ-ACK feedback transmission may be determined by a predetermined subslot length (e.g., the number of symbols included in a subslot). For example, the unit of the time difference from the DL data channel to the PUCCH for HARQ-ACK feedback transmission may be configured by a parameter subslotLengthForPUCCH in PUCCH-Config, which is configuration information used to configure UE-specific PUCCH parameters. According to these scenarios, the length unit of the PDSCH-to-HARQ feedback timing indicator may be configured for each HARQ-ACK codebook.

In some scenarios, UL or DL scheduling may be performed dynamically or semi-persistently. The BS may configure or indicate to the UE the transmission direction (e.g., DL, UL, or flexible) of each symbol semi-persistently based on a tdd-UL-DL-ConfigurationCommon or tdd-UL-DL-ConfigurationDedicated message or dynamically based on DCI format 2_0. The configured/indicated UL or DL scheduling may be canceled by the configured/indicated transmission direction. For example, a PUCCH configured for transmission of HARQ-ACK of an SPS PDSCH (hereinafter, SPS HARQ-ACK) may be canceled by a configured or indicated transmission direction. When transmission of HARQ-ACK information is canceled by the configured or indicated transmission direction, HARQ-ACK deferral which delays an (SPS) HARQ-ACK PUCCH, transmission of which is cancelled, to be transmitted in another slot is being considered in order to provide the HARQ-ACK information to the BS.

Figure 10:
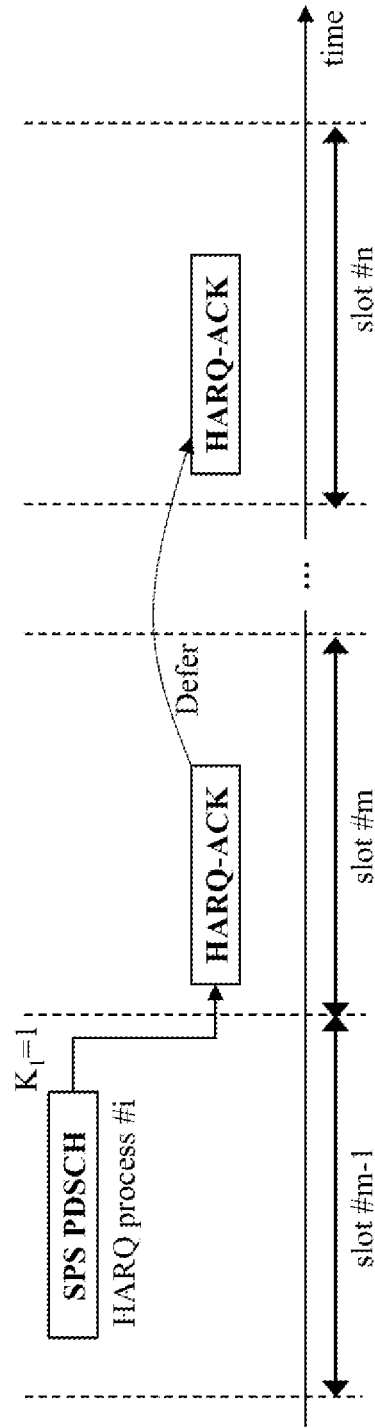
FIG. 10 illustrates an example of HARQ-ACK deferral.

FIG. 10 illustrates an example of HARQ-ACK deferral.

Figure 14:
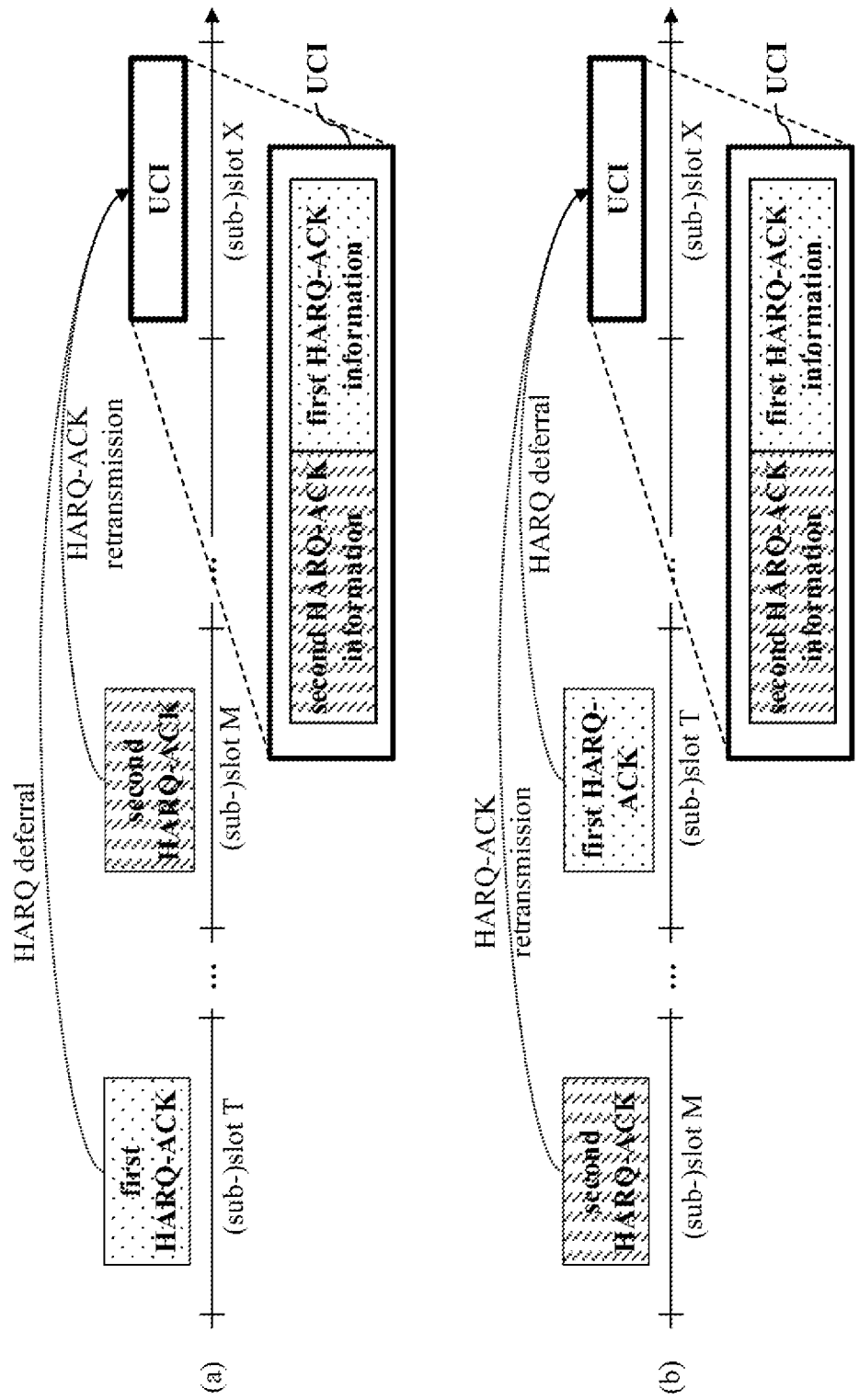
FIG. 14 illustrates another example of the UCI including various HARQ-ACKs to be transmitted in a slot, according to some implementations of the present disclosure.

In some scenarios (e.g., 3GPP NR Rel-16), when the UE receives a PDSCH scheduled by the BS, the UE may transmit a PUCCH carrying a HARQ-ACK for the PDSCH (hereinafter, HARQ-ACK PUCCH) at a time designated by scheduling information on the PDSCH. However, these series of operations always cause the UE to transmit the PUCCH after a lapse of a predetermined time from reception of a semi-persistently configured SPS PDSCH. As a result, a TDD UL-DL pattern that is not aligned with the periodicity of the SPS PDSCH may be used, PUCCH transmission may be easily canceled by the dynamic TDD operation of the BS, PDSCH transmission associated with the canceled PUCCH transmission may also be canceled, or retransmission may be requested. Accordingly, to solve these problems, an operation in which the UE defers a PUCCH timing determined for a PDSCH in a predetermined or arbitrary manner, that is, delaying operation is being considered. For example, when a PUCCH configured for transmission of a HARQ-ACK for an SPS PDSCH (hereinafter, SPS HARQ-ACK) is canceled by a configured or indicated transmission direction, HARQ-ACK deferral, which delays the HARQ-ACK transmission after the originally scheduled time, may be considered. Referring to FIG. 14, for example, when an SPS PDSCH in slot #m−1 uses HARQ process #i, and HARQ-ACK transmission for the SPS PDSCH is scheduled in slot #m, the UE may determine to defer a PUCCH in slot #m for the HARQ-ACK transmission for the SPS PDSCH to slot #n based on predetermined conditions. Due to such HARQ-ACK deferral, even if PUCCH transmission is canceled, the UE and BS may transmit/receive HARQ-ACK information for the SPS PDSCH later.

Although HARQ-ACK response transmission by dynamic PDSCH scheduling is not canceled by the configured or indicated transmission direction, PUCCH transmission itself may be canceled by inter-priority prioritization when HARQ-ACK included in the PUCCH is included in a low-priority HARQ-ACK codebook, and PUCCH transmission may not be successfully received by the BS due to a channel change etc. regardless of a scheduling method of the PDSCH.

If HARQ-ACK response transmission is canceled or fails, the BS may fail to determine whether corresponding PDSCH transmission is successful or not, which may cause PDSCH retransmission. This may basically generate an additional delay time in PDSCH transmission. If PUCCH transmission via which a HARQ-ACK codebook including a plurality of HARQ-ACKs is transferred is canceled, numerous PDSCHs corresponding thereto need to be transmitted again, which may cause a big problem in resource availability of a system. This problem may be solved by increasing the size of time-frequency resources used for the PUCCH/PUSCH to improve the reliability of uplink transmission delivering HARQ-ACK. However, UL radio resources of the system to use UL time-frequency resources that are large enough to always obtain satisfactory reliability may be limited.

To solve this problem, the following two methods may be considered. One is a HARQ process-based HARQ-ACK response, which is a Type-3 HARQ-ACK codebook that reports the status of HARQ process(es) that the UE has at a specific time, and the other is codebook retransmission-based one-shot HARQ-ACK retransmission that transmits a previous HARQ-ACK codebook again.

Hereinafter, in preparation for the case in which a HARQ-ACK response to PDSCH reception of the UE is not transmitted due to inter-priority prioritization or the BS fails to appropriately receive the HARQ-ACK response, implementations of the present disclosure will be described in relation to signaling of the BS that requests the HARQ-ACK response so that the BS may receive the HARQ-ACK response again. In addition, hereinbelow, implementations of the present disclosure will be described in relation to HARQ-ACK response retransmission in which the UE reconstructs the HARQ-ACK response for a HARQ-ACK retransmission request of the BS and transmits the HARQ-ACK response again on a PUCCH or a PUSCH in a slot. In addition, hereinbelow, implementations of the present disclosure will be described in which the UE constructs HARQ-ACK information when the UE intends to defer SPS HARQ-ACK that fails to be transmitted due to a semi-statically indicated DL symbol using a message such as tdd-UL-DL-ConfigurationCommon or tdd-UL-DL-ConfigurationDedicated so as to be transmitted in the slot.

Hereinbelow, in the case in which the UE supports both HARQ-ACK deferral and HARQ-ACK response retransmission, implementations of the present disclosure will be described in which the UE constructs HARQ-ACK information when it is determined that the UE should perform transmission of HARQ-ACK information by HARQ-ACK deferral and transmission of HARQ-ACK information by HARQ-ACK response retransmission in one slot. For example, method(s) and procedure(s) of transmitting a HARQ-ACK PUCCH in UL (sub-)slot Y are described, when the UE fails to transmit SPS HARQ-ACK in initially indicated and/or configured UL (sub-)slot X in a transmission direction (e.g., slot format) configured by the BS and defers SPS HARQ-ACK transmission until another UL (sub-)slot Y and when the UE retransmits, in (sub-)slot Y, a HARQ-ACK response or UCI that was included in previous PUCCH/PUSCH transmission or transmits, in (sub-)slot Y, status information (e.g., HARQ-ACK information) for a subset of HARQ processes that the UE currently has, according to indication by DCI received by the UE.

A UE using some implementations of the present disclosure may receive HARQ-ACK retransmission scheduling through L1 signaling and/or higher layer signaling of a BS to freely perform HARQ process-based retransmission or codebook-based retransmission.

Figure 11:
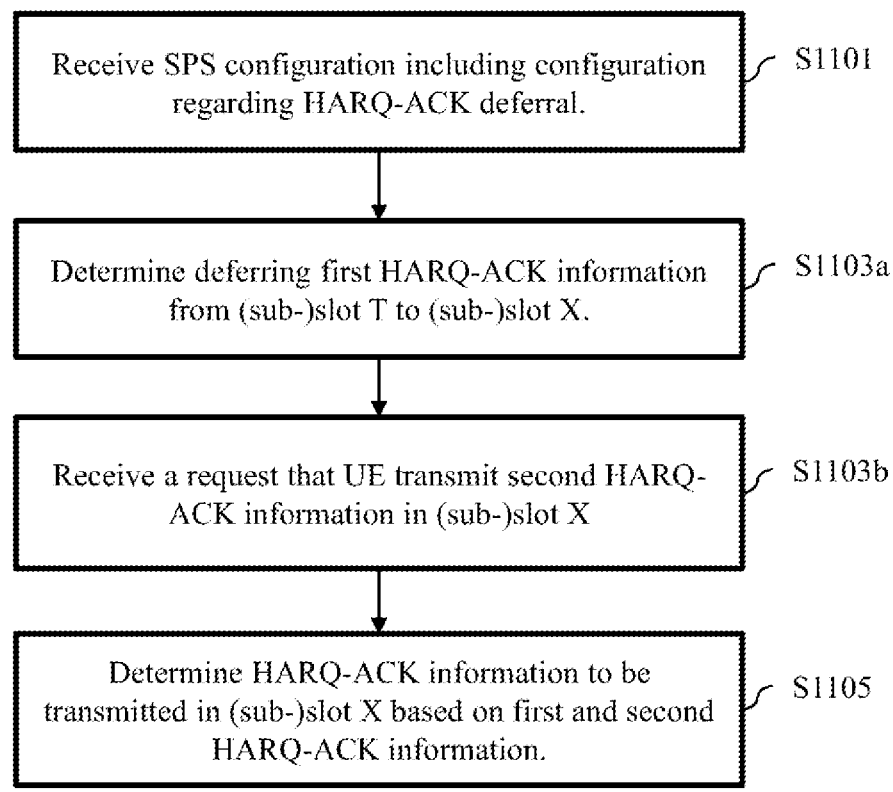
FIG. 11 illustrates an operational flow of a UE according to some implementations of the present disclosure.

FIG. 11 illustrates an operational flow of a UE according to some implementations of the present disclosure.

The UE may receive an RRC configuration (e.g., PDSCH-Config or PUCCH-Config) including a PDSCH reception method and a PUCCH transmission method from the BS. The UE may receive a DL-SCH (e.g., a TB) through an SPS PDSCH or a dynamically scheduled PDSCH and transmit a HARQ-ACK response thereto. In some implementations, whether to perform a HARQ-ACK deferral operation may be configured in each SPS PDSCH configuration received by the UE (S1101).

If the UE fails to transmit SPS HARQ-ACK of a slot T associated with an SPS PDSCH for which a HARQ-ACK deferral operation is configured due to overlap with a semi-statically configured DL symbol, the UE may defer transmission so as to be performed in the next nearest valid UL (sub-)slot X (S1103a). In this case, in some implementations, the validity of a certain slot for UL transmission may be limited to the case in which a PUCCH and/or a PUSCH to be transmitted does not overlap with the semi-statically configured DL symbol in consideration of a UL multiplexing operation between the PUCCH and/or the PUSCH of UL transmission scheduled to be transmitted in a corresponding slot and deferred HARQ-ACK.

Meanwhile, the UE may receive L1 signaling (e.g., DCI) delivered from the BS according to some implementations of the present disclosure (S1103b). Upon receiving the L1 signaling, the UE reconstructs a HARQ-ACK codebook according to some implementations of the present disclosure, based on previous HARQ-ACK response transmission or a HARQ-ACK response of HARQ processes, indicated by the L1 signaling. The UE may transmit the reconstructed HARQ-ACK codebook (e.g., second HARQ-ACK information) on a UL resource explicitly or implicitly indicated by the L1 signaling.

If the reconstructed HARQ-ACK codebook is transmitted in (sub-)slot X, in some implementations of the present disclosure, when there are HARQ-ACK information that is deferred to be transmitted in (sub-)slot X (e.g., first HARQ-ACK information) and a HARQ-ACK codebook scheduled to be transmitted in (sub-)slot X (e.g., third HARQ-ACK information), the UE may construct HARQ-ACK information as follows in consideration of the third HARQ-ACK information (S1105).

There may be a HARQ-ACK codebook scheduled to be transmitted in (sub-)slot X. In this case, the UE may perform transmission by appending the reconstructed HARQ-ACK codebook to the HARQ-ACK codebook, transmission of which has been scheduled in (sub-)slot X. The UE may perform transmission by appending HARQ-ACK deferred to (sub-)slot X to this HARQ-ACK codebook (i.e., the HARQ-ACK codebook obtained by appending the reconstructed HARQ-ACK codebook to the HARQ-ACK codebook scheduled to be transmitted in (sub-)slot X (see FIG. 12).

Alternatively, the UE may exclude HARQ-ACK deferred to be transmitted in (sub-)slot X according to information in the HARQ-ACK codebook scheduled in (sub-)slot X and information in the reconstructed HARQ-ACK codebook. For example, when HARQ-ACK information of HARQ process(es) associated with deferred HARQ-ACK is included in the reconstructed HARQ-ACK codebook, the UE may drop deferred HARQ-ACK transmission by excluding deferred HARQ-ACK transmission from transmission in (sub-)slot X.

The UE may determine UCI including HARQ-ACK information constructed according to some implementations of the present disclosure and transmit the UCI in (sub-)slot X.

Figure 12:
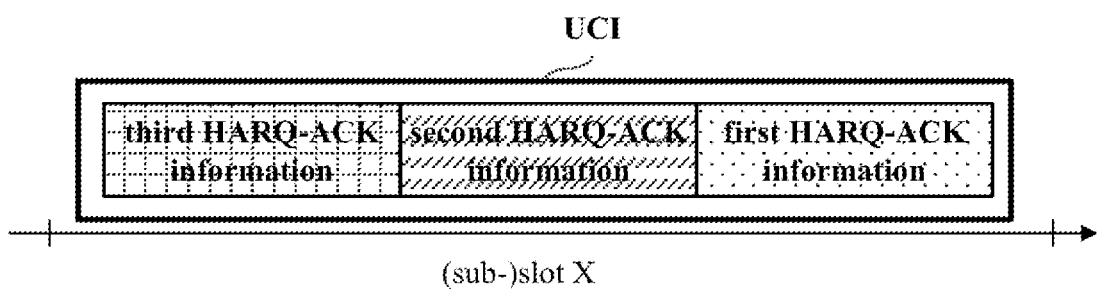
FIG. 12 illustrates an example of UCI including various HARQ-ACKs to be transmitted in a slot, according to some implementations of the present disclosure.

FIG. 12 illustrates an example of UCI including various HARQ-ACKs to be transmitted in a slot, according to some implementations of the present disclosure. In the example of FIG. 12, first HARQ-ACK information is HARQ-ACK information, transmission of which is deferred to (sub-)slot X from (sub-)slot T by HARQ deferral, second HARQ-ACK information is a retransmission for a previous HARQ-ACK response requested through DCI or a HARQ process-based HARQ-ACK response requested through the DCI, and third HARQ-ACK information is HARQ-ACK information scheduled to be transmitted in (sub-)slot X. Referring to FIG. 12, UCI may sequentially include the first HARQ-ACK information (if any), the second HARQ-ACK information (if any), and the third HARQ-ACK information (if any) as illustrated.

Some implementations of the present disclosure, in particular, implementations illustrated in FIG. 12, have the following advantages. A slot and a PUCCH resource, for a deferred HARQ-ACK codebook, are determined in consideration of UL multiplexing between the deferred HARQ-ACK codebook and other UL transmissions scheduled to be transmitted in a candidate slot. For example, after the UE multiplexes the deferred HARQ-ACK codebook with other UCI in the candidate slot, if a PUCCH resource for the multiplexed UCI is available for UL transmission, the UE transmits the multiplexed UCI on the PUCCH resource. Otherwise, the UE determines whether the deferred HARQ-ACK codebook may be transmitted in the next candidate slot. According to some implementations of the present disclosure, if transmission of the deferred HARQ-ACK codebook overlaps in time with transmission of other HARQ-ACK codebook(s), the deferred HARQ-ACK codebook is located later than the other HARQ-ACK codebook(s) in a UCI payload. Therefore, if UCI including the deferred HARQ-ACK codebook in the candidate slot is incapable of being transmitted, there is an advantage that the deferred HARQ-ACK codebook may be easily separated from the UCI payload. On the other hand, in the case of a HARQ-ACK codebook of initial transmission and a HARQ-ACK codebook of retransmission, the length of the HARQ-ACK codebook of initial transmission may change and a decoding result of the HARQ-ACK codebook of initial transmission needs to be updated, each time PDSCH scheduling is performed until initial transmission. In contrast, since the HARQ-ACK codebook of retransmission targets previously transmitted value(s), there is no change in the value(s). Since the UE is unaware of when the HARQ-ACK codebook of retransmission will be indicated, the UE may simplify an operation thereof by appending the HARQ-ACK codebook of retransmission after the HARQ-ACK codebook of initial transmission at a timing when update of the HARQ-ACK codebook of initial transmission has completely ended (e.g., a timing when other scheduling from the BS is not expected), rather than pre-constructing a HARQ-ACK codebook that may be retransmitted and appending the HARQ-ACK codebook of initial transmission after the HARQ-ACK codebook of retransmission.

Figure 13:
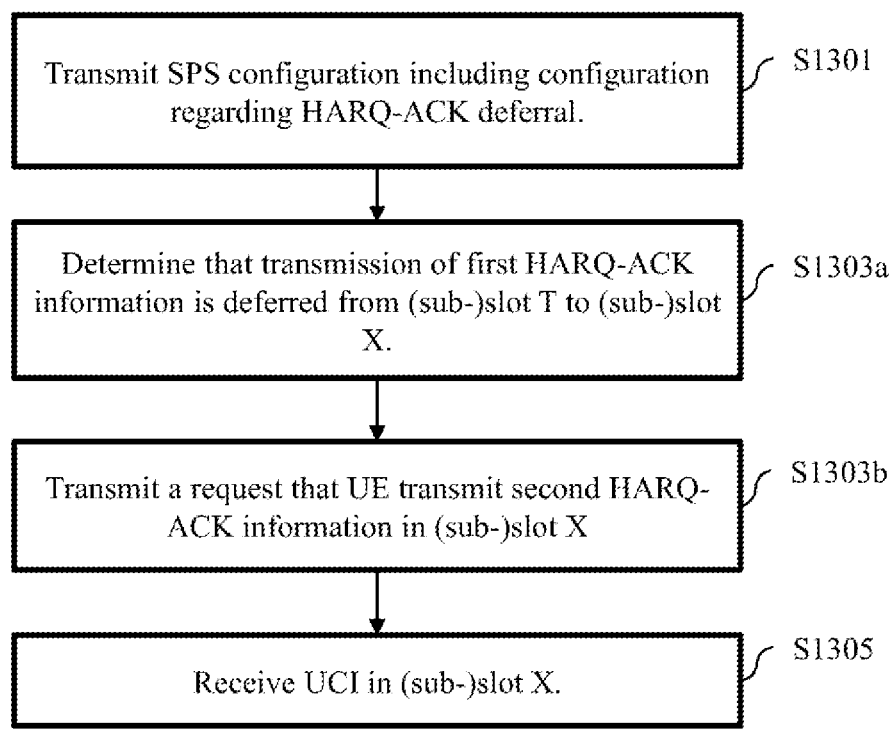
FIG. 13 illustrates an operational flow of a BS according to some implementations of the present disclosure.

FIG. 13 illustrates an operational flow of a BS according to some implementations of the present disclosure.

The BS may perform an RRC configuration including a PDSCH reception method and a PUCCH transmission method for the UE. The BS may transmit a DL-SCH (e.g., a TB) through an SPS PDSCH or a dynamically scheduled PDSCH and receive a HARQ-ACK response thereto. According to some implementations of the present disclosure, the BS may transmit, to the UE, L1 signaling (e.g., DCI) regarding a HARQ-ACK codebook (e.g., a first HARQ-ACK codebook) that requires retransmission by the UE (S1301).

The BS may receive the HARQ-ACK codebook while expecting that the UE that has received the L1 signaling will reconstruct the HARQ-ACK codebook according to some implementations of the present disclosure based on previous HARQ-ACK response transmission indicated by the L1 signaling and will transmit the reconstructed HARQ-ACK codebook on a UL resource explicitly or implicitly indicated by the L1 signaling. The BS may receive a second HARQ-ACK codebook associated with the first HARQ-ACK codebook on the UL resource explicitly or implicitly indicated by the L1 signaling.

If the UE fails to transmit SPS HARQ-ACK of a slot T associated with an SPS PDSCH for which a HARQ-ACK deferral operation is configured due to overlap with a semi-statically configured DL symbol, the BS may determine that the UE will defer transmission so as to be performed in the next nearest valid UL (sub-)slot X (S1303a). In this case, in some implementations, the validity of a certain slot for UL transmission may be limited to the case in which a PUCCH and/or a PUSCH to be transmitted does not overlap with the semi-statically configured DL symbol in consideration of a UL multiplexing operation between the PUCCH and/or the PUSCH of UL transmission scheduled to be transmitted in a corresponding slot and deferred HARQ-ACK.

Meanwhile, the BS may transmit, to the UE, L1 signaling (e.g., DCI) including a request for retransmission of a previous HARQ-ACK response that the UE transmitted or would transmit or a request for transmission of a HARQ process-based HARQ-ACK response (S1303b). When the UE receives the L1 signaling, the BS may expect that the UE will reconstruct a HARQ-ACK codebook according to some implementations of the present disclosure, based on previous HARQ-ACK response transmission or a HARQ-ACK response of HARQ processes, indicated by the L1 signaling. The BS may receive the reconstructed HARQ-ACK codebook (e.g., second HARQ-ACK information) on a UL resource explicitly or implicitly indicated by the L1 signaling.

If the reconstructed HARQ-ACK codebook is transmitted in (sub-)slot X, in some implementations of the present disclosure, when there are HARQ-ACK information that is deferred to be transmitted in (sub-)slot X (e.g., first HARQ-ACK information) and a HARQ-ACK codebook scheduled to be transmitted in (sub-)slot X (e.g., third HARQ-ACK information), the BS may expect that the UE will construct HARQ-ACK information as follows in consideration of the third HARQ-ACK information.

There may be a HARQ-ACK codebook scheduled to be transmitted in (sub-)slot X. In this case, the BS may expect that the UE will perform transmission by appending the reconstructed HARQ-ACK codebook to the HARQ-ACK codebook, transmission of which has been scheduled in (sub-)slot X. The BS may expect that the UE will perform transmission by appending HARQ-ACK deferred to be transmitted in (sub-)slot X to this HARQ-ACK codebook obtained by appending the reconstructed HARQ-ACK codebook to the HARQ-ACK codebook scheduled to be transmitted in (sub-)slot X.

Alternatively, the BS may expect that the UE will construct HARQ-ACK information by excluding HARQ-ACK deferred to be transmitted in (sub-)slot X according to information in the HARQ-ACK codebook scheduled to be transmitted in (sub-)slot X and information in the reconstructed HARQ-ACK codebook. For example, when HARQ-ACK information of HARQ process(es) associated with deferred HARQ-ACK is included in the reconstructed HARQ-ACK codebook, the BS may expect that the UE will drop deferred HARQ-ACK transmission by excluding deferred HARQ-ACK transmission from transmission in (sub-)slot X.

The BS may expect that the UE will determine UCI including HARQ-ACK information constructed according to some implementations of the present disclosure and transmit the UCI in (sub-)slot X and may receive the UCI in (sub-)slot X (S1305).

The UE and the BS may perform an RRC configuration for determining a slot format through an SPS PDSCH and a TDD operation. The BS may configure one or more SPS PDSCHs for the UE (i.e., may provide one or more SPS configurations to the UE), and the UE may receive an SPS PDSCH and perform PUCCH transmission associated therewith. When PUCCH transmission is canceled by the UE, the UE delays corresponding PUCCH transmission and the BS may indicate new scheduling for a HARQ process associated with PUCCH transmission on a resource after a canceled PUCCH resource. In some implementations, the UE may receive a plurality of schedulings for one HARQ process before a HARQ-ACK response and perform HARQ-ACK PUCCH transmission by multiplexing the schedulings.

The UE and the BS may perform an RRC configuration for PDSCH reception/transmission and PUCCH reception/transmission. The BS may schedule an SPS PDSCH or a PDSCH for the UE, and the UE may receive the (semi-statically or dynamically) scheduled PDSCH and transmit a HARQ-ACK response associated therewith. The BS may transmit, to the UE, L1 signaling (e.g., DCI) requesting retransmission according to some implementations of the present specification with respect to a HARQ-ACK response requiring retransmission or UL transmission including the HARQ-ACK response. Upon receiving the L1 signaling, the UE may reconstruct a HARQ-ACK codebook using the proposed methods according to some implementations of the present disclosure based on previous HARQ-ACK response transmission indicated by the L1 signaling and transmit the reconstructed HARQ-ACK codebook on a UL resource explicitly or implicitly indicated by the L1 signaling. The BS may receive the HARQ-ACK response retransmitted by the UE and, if necessary, update the status of HARQ process(es) according to the corresponding HARQ-ACK response.

Some methods of implementations of the present disclosure described below may be selectively applied. Alternatively, each method may be independently applied without being combined with other methods. Alternatively, one or more methods may be applied in a combination or associated form. Some terms, symbols, orders, etc. used in the present disclosure may be replaced with other terms, symbols, orders, etc.

In some implementations of the present disclosure, the UE may use one or multiple HARQ-ACK retransmission methods. The HARQ-ACK retransmission methods may include the following HARQ-ACK retransmission methods.

(HARQ process-based) (Rel-16) Type-3 codebook
  For example, the Type-3 HARQ-ACK codebook defined in Section 9.1.4 of version 16 of 3GPP TS 38.213 may be used for HARQ-ACK transmission.
  The UE indicated to retransmit HARQ-ACK through the (Rel-16) Type-3 codebook may report status information of all HARQ processes configured for the UE (e.g., respective HARQ-ACKs of all HARQ processes) through one Type-3 codebook.
  In some implementations of the present disclosure, the (Rel-16) Type-3 codebook may also include new data indicator (NDI) information for each HARQ process, and HARQ-ACK of each HARQ process may include a set of HARQ-ACK(s) for each codebook block group. An NDI may be used to determine whether a transmitted/received TB for a given HARQ process is new transmission or retransmission. If the NDI has been toggled in PDSCH scheduling DCI compared to a previous NDI value, i.e., if an NDI value in the PDSCH scheduling DCI is different from an NDI value sent in previous transmission, this may mean that a corresponding TB scheduled by the PDSCH scheduling DCI is new DL data.

(HARQ process-based) enhanced Type-3 codebook
  A Type-3 codebook that selectively transmits only partial information of the (Rel-16) Type-3 codebook may be used for HARQ-ACK transmission. In the present disclosure, for convenience of description, a HARQ process-based codebook used to report HARQ-ACK information for all HARQ processes configured for the UE is referred to as the (Rel-16) Type-3 codebook or a legacy Type-3 codebook, and a HARQ process-based codebook used to report HARQ-ACK information for some of the HARQ processes configured for the UE is referred to as the enhanced Type-3 codebook.
    As an example, the enhanced Type-3 codebook may be a Type-3 HARQ-ACK codebook configured for an indicated and/or configured subset of HARQ processes. For example, if the UE supports a maximum of A serving cells and a maximum of B HARQ processes on DL in each serving cell, the BS may respectively indicate, to the UE, whether B HARQ processes are subjected to the enhanced Type-3 codebook with respect to each of the A serving cells. For example, three serving cells of cell #0, cell #1, and cell #2 may be configured for the UE, and a Rel-16 Type-3 codebook, enhanced Type-3 HARQ-ACK codebook 0 in which HARQ processes #2, #4, and #5 of cell #0 and HARQ processes #2 and #3 of cell #2 are configured, and enhanced Type-3 HARQ-ACK codebook 1 in which HARQ processes #0 and #2 of cell #1 are configured may be configured for the UE by the BS. Upon receiving DCI including indication for enhanced Type-3 HARQ-ACK codebook 1, the UE may transmit a HARQ-ACK codebook including HARQ-ACK information for each of HARQ processes #0 and #2 of cell #1.

As another example, the enhanced Type-3 codebook may be a Type-3 HARQ-ACK codebook configured for an indicated and/or configured subset of component carriers (CCs). For example, if the UE supports a maximum of A serving cells, the BS may provide the UE with information indicating whether corresponding HARQ processes of the A serving cells are subjected to a corresponding enhanced Type-3 codebook. For example, three serving cells of cell #0, cell #1, and cell #2 may be configured for the UE, HARQ processes #0 to #5 for cell #0, HARQ processes #0 to #5 for cell #1, and HARQ processes #0 to #3 for cell #2 may be configured, and a Rel-16 Type-3 codebook, enhanced Type-3 HARQ-ACK codebook 0 in which cell #0 and cell #2 are configured, and enhanced Type-3 HARQ-ACK codebook 1 in which cell #1 is configured may be configured for the UE by the BS. Upon receiving DCI including indication for enhanced Type-3 HARQ-ACK codebook 1, the UE may transmit a HARQ-ACK codebook including HARQ-ACK information for each of HARQ processes #0 to #5 of cell #1.

As another example, the enhanced Type-3 codebook may be a Type-3 HARQ-ACK codebook configured for a subset of HARQ processes used for SPS PDSCH(s).

As another example, the enhanced Type-3 codebook may be a Type-3 HARQ-ACK codebook configured for a subset of HARQ processes that may be used for UL transmission with a high priority index.

The UE indicated to retransmit HARQ-ACK through the enhanced Type-3 codebook may report status information of some HARQ processes selected through a method indicated to or configured for the UE through one Type-3 codebook.

In some implementations of the present specification, the enhanced Type-3 codebook may also include NDI information for each HARQ process, and HARQ-ACK of each HARQ process may include a set of HARQ-ACK(s) for each codebook block group.

Methods of selecting a plurality of enhanced Type-3 codebooks, i.e., a plurality of HARQ processes, may be configured for the UE. The UE for which a plurality of HARQ process selection methods is configured may use one HARQ process selection method indicated together through L1 signaling (e.g., DCI) or higher layer signaling provided by the BS when the enhanced Type-3 codebook is indicated. The plurality of enhanced Type-3 codebooks may be different subsets of HARQ-ACK processes for which the UE will report HARQ-ACK information.

(Codebook-based) one-shot HARQ-ACK retransmission

The UE may receive DCI X that explicitly or implicitly indicates a previously scheduled PUCCH or PDSCH to the UE from the BS and retransmit a PUCCH indicated by the DCI, a HARQ-ACK codebook included in the PUCCH, or a HARQ-ACK response corresponding to the PDSCH. Hereinafter, for convenience of description, a PUCCH that the UE transmitted or would transmit before the UE receives DCI X and that is indicated by the DCI or a PUCCH scheduled in a slot indicated by the DCI is referred to as a previous PUCCH, and a PUCCH transmitted based on DCI X and the previous PUCCH is referred to as a new PUCCH.

A UCI payload during retransmission may be a UCI payload generated based on a slot in which HARQ-ACK transmission for which retransmission is requested is previously scheduled.

When the UE is indicated to perform one-shot HARQ-ACK retransmission, the UE may additionally receive an indicator through which HARQ-ACK transmission for which retransmission is requested explicitly indicates a previously scheduled PUCCH or PDSCH. This indicator may indicate the previously scheduled PUCCH or PDSCH based on a newly scheduled PUCCH in units of slot offsets, together with one-shot HARQ-ACK retransmission indication. For example, a difference between a slot index of a slot which is scheduled by DCI X or includes a new PUCCH to be transmitted based on DCI X and a slot index of a previous slot that DCI X intends to indicate may be indicated to the UE. Alternatively, the indicator may indicate the previously scheduled PUCCH or PDSCH in units of slot offsets based on a reception time of one-shot HARQ-ACK retransmission indication. For example, a difference between a slot index of a slot in which a PDCCH through which DCI X is received is located and a slot index of a slot that DCI X intends to indicate may be indicated to the UE. The UE that transmitted or would transmit a PUCCH or PUSCH having a first HARQ-ACK codebook in slot m may be indicated to transmit the PUCCH having the first HARQ-ACK in slot n+K which is located after slot m by DCI X received in a PDCCH ending in slot n. DCI X may include information about slot offset L and the UE may determine slot m as m=n−L.

Hereinafter, a (legacy or enhanced) Type-3 HARQ-ACK codebook requested to be transmitted by DCI, or a HARQ-ACK codebook transmitted in a (sub-)slot later than (sub-)slot M by DCI including a retransmission request for a HARQ-ACK codebook that the UE transmitted or would transmit in previous (sub-)slot M will be referred to as a retransmission HARQ-ACK codebook, a HARQ-ACK retransmission codebook, or a HARQ-ACK codebook of HARQ-ACK retransmission.

<Implementation 1> UL Multiplexing Between Deferred HARQ-ACK and Re-Transmitted HARQ-ACK When the UE fails to transmit SPS HARQ-ACK information of a slot T associated with an SPS PDSCH (e.g., for which a HARQ-ACK deferral operation is configured) due to overlap with a semi-statically configured DL symbol, the UE may defer transmission of the SPS HARQ-ACK information so as to be transmitted in the next nearest valid UL (sub-)slot X. Hereinafter, such a HARQ-ACK transmission operation is referred to as "deferred HARQ-ACK", "HARQ-ACK deferral" or "HARQ deferral", for convenience. Simultaneously with HARQ deferral, the UE may be instructed to retransmit, in (sub-)slot X, HARQ-ACK that has been previously transmitted or has been scheduled through L1 signaling and/or higher layer signaling of the BS. Hereinafter, this HARQ-ACK transmission operation is referred to as "HARQ-ACK retransmission" or "retransmitted HARQ-ACK", for convenience. For example, a HARQ-ACK retransmission codebook may be configured in a form of mapping HARQ-ACK information for PDSCH reception corresponding to each HARQ process with respect to all or some specific HARQ processes.

As such, when PUCCH transmission is required due to HARQ-ACK deferral and HARQ-ACK retransmission in one (sub-)slot X, in some implementations of the present disclosure, the UE may perform transmission by multiplexing HARQ-ACKs of two PUCCH transmissions. In this case, a PUCCH through which the multiplexed HARQ-ACKs are transmitted may be determined by a PUCCH resource indicator (PRI) of DCI that indicates HARQ-ACK retransmission and by a total UCI payload size.

FIG. 14 illustrates another example of the UCI including various HARQ-ACKs to be transmitted in a slot, according to some implementations of the present disclosure.

In some implementations of the present disclosure, when transmission of deferred HARQ-ACK information and HARQ-ACK retransmission are performed in one (sub-)slot X, the UE may configure HARQ-ACK information as follows.

Option 1_1: The UE may perform transmission by appending or concatenating HARQ-ACK that is deferred to (sub-)slot X to a HARQ-ACK codebook of HARQ-ACK retransmission indicated in (sub-)slot X. For example, referring to FIG. 14, when HARQ-ACK information (first HARQ-ACK in FIG. 14) deferred to (sub-)slot X and HARQ-ACK information (second HARQ-ACK in FIG. 14) indicated by HARQ-ACK transmission triggering DCI that requests (re)transmission in (sub-)slot X are present, the UE may construct HARQ-ACK information by appending the first HARQ-ACK information deferred to be transmitted in (sub-)slot X after second HARQ-ACK, which is HARQ-ACK information for HARQ-ACK retransmission, irrespective of a time order of a slot before first HARQ-ACK is deferred, i.e., (sub-)slot T in which transmission of first HARQ-ACK has initially been scheduled, and (sub-)slot M in which the UE transmitted or would transmit second HARQ-ACK, (sub-)slot M being earlier than (sub-)slot X, or irrespective of a time order of (sub-)slot T in which transmission of first HARQ-ACK has initially been scheduled and a (sub-)slot in which the HARQ-ACK transmission triggering DCI that requests (re)transmission of second HARQ-ACK in (sub-)slot X is received. A payload size of a deferred HARQ-ACK codebook may continue to change according to the number of SPS HARQ-ACKs, transmission of which is canceled due to overlap with a DL symbol. In contrast, a payload size of a Type-3 based HARQ-ACK codebook is constant according to whether associated HARQ processes and an NDI are included and/or whether CBG-level feedback is performed. Alternatively, the payload size of the Type-3 based HARQ-ACK codebook is constant because a one-shot retransmission codebook is constructed by retransmitting a codebook that was transmitted in the past. Therefore, when generating HARQ-ACK information by appending SPS HARQ-ACK information having a non-uniform payload size after a HARQ-ACK retransmission codebook of a constant size, HARQ-ACK information may be easily generated compared to the reverse case. In addition, in order for certain (sub-)slot X to be determined as a target slot used for transmission of HARQ-ACK information deferred from transmission in another (sub-)slot before (sub-)slot X, multiplexed UCI should be capable of being transmitted in (sub-)slot X when other UCI in corresponding (sub-)slot X is multiplexed with the deferred HARQ-ACK information. If the multiplexed UCI is incapable of being transmitted in (sub-)slot X, the deferred HARQ-ACK information should be excluded from UCI to be transmitted in slot (sub-)slot X. According to Option 1_1, since the deferred HARQ-ACK information is appended after other HARQ-ACK information, the deferred HARQ-ACK information may be easily removed from the UCI of (sub-)slot X when the deferred HARQ-ACK information is incapable of being transmitted in (sub-)slot X.

In some implementations, when one or multiple HARQ-ACK retransmission codebooks are indicated, one of the following methods may be used to construct the all HARQ-ACK retransmission codebooks.

Option 1_1-1: The UE may construct HARQ-ACK information by appending HARQ-ACK retransmission codebooks in order of reception timings of corresponding DCI that indicates HARQ-ACK retransmission. For example, upon receiving first DCI that triggers transmission of a first HARQ-ACK retransmission codebook and second DCI that triggers transmission of a second HARQ-ACK retransmission codebook, the UE may construct HARQ-ACK information by appending the second HARQ-ACK retransmission codebook after the first HARQ-ACK retransmission codebook when a symbol in which reception of the first DCI ends is earlier than a symbol in which reception of the second DCI ends and construct the HARQ-ACK information by appending the first HARQ-ACK retransmission codebook after the second HARQ-ACK retransmission codebook when a symbol in which reception of the second DCI ends is earlier than a symbol in which reception of the first DCI ends.

Option 1_1-2: The UE may construct HARQ-ACK information by appending HARQ-ACK retransmission codebooks in a fixed order according to each HARQ-ACK retransmission method. As an example, the UE may construct the HARQ-ACK information by appending the HARQ-ACK retransmission codebooks in order of a HARQ process-based (i.e., legacy Type-3 or enhanced Type-3) codebook and a codebook-based (i.e., one-shot) codebook. Upon receiving HARQ-ACK transmission triggering DCI that requests transmission of the HARQ process-based HARQ-ACK codebook (e.g., DCI that requests transmission of the (enhanced) Type-3 codebook) and HARQ-ACK transmission triggering DCI that requests that a previous HARQ-ACK codebook that the UE transmitted or would transmit in (sub-)slot M be transmitted in (sub-)slot X (e.g., a DCI that requests one-shot HARQ-ACK retransmission), the UE may construct the HARQ-ACK information by appending the previous HARQ-ACK codebook after the HARQ process-based HARQ-ACK codebook.

Option 1_2: (In consideration of a HARQ process for deferred HARQ-ACK), the UE may exclude the above process of appending or concatenating HARQ-ACK, transmission of which is deferred until (sub-)slot X, according to information of a HARQ-ACK codebook of HARQ-ACK retransmission indicated in (sub-)slot X. For example, at least one of the following options may be considered.

Option 1_2-0: When HARQ-ACK information of a HARQ process associated with deferred HARQ-ACK is not included in a HARQ-ACK codebook of HARQ-ACK retransmission, the UE may stop a HARQ-ACK deferral operation. In this case, the UE may stop the HARQ-ACK deferral operation for deferred all HARQ-ACK information.

In this case, in some implementations, the UE may operate to perform transmission by appending or concatenating the entire deferred HARQ-ACK information to the HARQ-ACK codebook of HARQ-ACK retransmission.

Option 1_2-1: When at least one HARQ-ACK information among HARQ-ACK information of a HARQ process associated with deferred HARQ-ACK is included in the HARQ-ACK codebook of HARQ-ACK retransmission, the UE may stop the HARQ-ACK deferral operation. In this case, the stopping of the HARQ-ACK deferral operation may be performed for all deferred HARQ-ACK information.

In this case, in some implementations, the UE may perform transmission by appending or concatenating the deferred all HARQ-ACK information to the HARQ-ACK codebook of HARQ-ACK retransmission or appending or concatenating only the remaining HARQ-ACK information, except for HARQ-ACK information corresponding to a HARQ process included in the HARQ-ACK codebook of HARQ-ACK retransmission among the deferred HARQ-ACK information, to the HARQ-ACK codebook of HARQ-ACK retransmission.

Option 1_2-2: When all HARQ-ACK information of the HARQ process associated with deferred HARQ-ACK is included in the HARQ-ACK codebook of HARQ-ACK retransmission, the UE may stop the HARQ-ACK deferral operation.

In this case, in some implementations, the UE may omit the process of appending or concatenating the deferred HARQ-ACK information to the HARQ-ACK codebook of HARQ-ACK retransmission and operate to transmit only a HARQ-ACK codebook of corresponding HARQ-ACK retransmission.

In Option 1_2 or other some implementations of the present disclosure, the HARQ-ACK deferral operation may be stopped for all deferred HARQ-ACK information or may be stopped based on each SPS configuration. When the HARQ-ACK deferral operation is stopped based on each SPS configuration, the UE may not perform the HARQ-ACK deferral operation any more for HARQ-ACK information for which the deferral operation is stopped and/or HARQ-ACK information of the same SPS configuration as the HARQ-ACK information for which the deferral operation is stopped. For HARQ-ACK information for which the deferral operation is not stopped among the deferred HARQ-ACK information excluded from transmission in slot X, the UE may assume that the corresponding slot and a PUCCH resource are invalid for the deferral operation. Then, the UE may continue to perform the HARQ-ACK deferral operation in the next slot and perform transmission by deferring HARQ-ACK until the earliest valid slot.

Option 1_2-3: When all or part of HARQ-ACK information of the HARQ process associated with deferred HARQ-ACK is included in the HARQ-ACK codebook of HARQ-ACK retransmission, the UE may continue to perform the HARQ-ACK deferral operation by excluding deferred HARQ-ACK transmission from transmission in (sub-)slot X. That is, the UE may assume that the corresponding slot and a PUCCH resource are invalid in the HARQ-ACK deferral operation. Then, the UE may continue to perform the HARQ-ACK deferral operation in the next slot and perform transmission by deferring HARQ-ACK until the earliest valid slot.

Option 1_3: (In consideration of a HARQ process for HARQ-ACK retransmission) the UE may not perform HARQ-ACK retransmission in (sub-)slot X based on information of a reconstructed HARQ-ACK codebook scheduled in (sub-)slot X and information of deferred HARQ-ACK. For example, at least one of the following options may be considered.

Option 1_3-1: If at least one HARQ-ACK information among HARQ-ACK information of HARQ process(es) associated with deferred HARQ-ACK(s) is included in the HARQ-ACK codebook of HARQ-ACK retransmission, the UE may stop HARQ-ACK retransmission and cancel PUCCH transmission. Alternatively, the UE may not expect that HARQ-ACK retransmission including HARQ-ACK information transmitted through the HARQ-ACK deferral operation will be indicated.

Option 1_3-2: When all HARQ-ACK information of the HARQ process(es) associated with deferred HARQ-ACK(s) is included in the HARQ-ACK codebook of HARQ-ACK retransmission, the UE may stop HARQ-ACK retransmission and cancel PUCCH transmission. Alternatively, the UE may not expect that HARQ-ACK retransmission that may include all HARQ-ACK information transmitted through the HARQ-ACK deferral operation will be indicated.

In applying Option 13, the UE may or may not apply other methods according to each HARQ-ACK retransmission method. As an example, in some implementations, the UE may use Option 1_2 for HARQ process-based retransmission and use Option 1_3 only for codebook-based retransmission.

In using Implementation 1, different methods may be used according to a HARQ-ACK PUCCH or codebook scheduled in (sub-)slot X. As an example, different methods may be used according to a codebook including only SPS HARQ-ACK, a codebook including only HARQ-ACK corresponding to one PDSCH scheduled with DCI format 10, a Type-1 codebook, and a Type-2 codebook.

<Implementation 2> Timeline Between HARQ-ACK Deferral and HARQ-ACK Retransmission In using Implementation 1, it may be necessary for the UE to cancel and drop HARQ-ACK retransmission or deferred HARQ-ACK transmission as in Option 1_2 or 1_3. Alternatively, even if HARQ-ACK retransmission and deferred HARQ-ACK transmission are not transmitted in one slot or subslot as in Implementation 1, when HARQ-ACK retransmission is indicated earlier than deferred HARQ-ACK transmission so that the UE may transmit HARQ-ACK information of the same HARQ process as deferred HARQ-ACK, deferred HARQ-ACK transmission may be canceled because deferred HARQ-ACK transmission is no longer required. However, in order for the UE to cancel previously scheduled UL transmission, it takes time to process cancellation. Therefore, the BS may have to guarantee the UE a sufficient time for canceling UL transmission so that the UE may smoothly cancel UL transmission. For this purpose, one of the following methods may be considered.

Alt. 2_1: When HARQ-ACK transmission, retransmission of which is deferred, is canceled, the last symbol of DCI that indicates HARQ-ACK retransmission may need to be earlier by a predetermined time T than the start of an SPS HARQ-ACK PUCCH on which deferred HARQ-ACK is to be transmitted or the start of a slot in which SPS HARQ-ACK is deferred. This serves to guarantee a minimum time T required for processing between a reception timing of the DCI indicating HARQ-ACK retransmission and a canceled UL resource. In this case, a processing time $T_{proc,1}$ used for PDSCH reception and HARQ-ACK transmission processes defined in 3GPP TS 38.214 may be used as the processing time T. For example, if the first uplink symbol of the PUCCH which carries the HARQ-ACK information, as defined by the assigned HARQ-ACK timing $K_1$ and the PUCCH resource to be used and including the effect of the timing advance, starts no earlier than at symbol $L_1$, where $L_1$ is defined as the next uplink symbol with its CP starting after $T_{proc,1}=(N_1+d_{1,1}+d_2)*(2048+144)*\kappa*2^{-u}*T_c+T_{ext}$ after the end of the last symbol of the PDSCH carrying the transport block acknowledged, then the UE provides a valid HARQ-ACK message.

$N_1$ is based on u of Table 10 and Table 11 for UE processing capabilities #1 and #2, respectively, and u is one of ($u_{PDCCH}$, $u_{PDSCH}$, $u_{UL}$), that causes the largest $T_{proc,1}$, where $u_{PDCCH}$ corresponds to a subcarrier spacing of a PDCCH for scheduling the PDSCH, $u_{PDSCH}$ corresponds to a subcarrier spacing of the scheduled PDSCH, $U_{UL}$ corresponds to a subcarrier spacing of a UL channel on which HARQ-ACK is to be transmitted, and $\kappa=T_c/T_f=64$. In Table 10, in the case of $N_{1,0}$, if a PDSCH DMRS position of an added DMRS is $l_1=12$, then $N_{1,0}=14$ and, otherwise, $N_{1,0}=13$ (refer to Section 7.4.1.1.2 of 3GPP TS 38.211). For operation with shared spectrum channel access, $T_{ext}$ may be calculated according to section 5.3.1 of 3GPP TS 38.211, otherwise $T_{ext}$ may be equal to 0. For the PDSCH mapping type A, if the last symbol of PDSCH is on the i-th symbol of the slot where i<7, $d_{1,1}$ may be equal to 7-i, otherwise $d_{1,1}$ may be equal to 0. If a PUCCH of a larger priority index would overlap with PUCCH/PUSCH of a smaller priority index, $d_2$ for the PUCCH of a larger priority may be set as reported by the UE; otherwise $d_2$ may be equal to 0. For UE processing capability #1 and if the PDSCH is mapping type B: if the number of PDSCH symbols allocated is L>=7, then $d_{1,1}$ may be equal to 0, if the number of PDSCH symbols allocated is L>=4, then $d_{1,1}$ may be equal to 7-L, if the number of PDSCH symbols allocated is L=3 then $d_{1,1}$ may be equal to 3+min(d,1), where d is the number of overlapping symbols of the scheduling PDCCH and the scheduled PDSCH, and if the number of PDSCH symbols allocated is 2, then $d_{1,1}$ may be equal to 3+d, where d is the number of overlapping symbols of the scheduling PDCCH and the scheduled PDSCH. For UE processing capability #2 and if the PDSCH is mapping type B: if the number PDSCH symbols allocated is L>=7, then $d_{1,1}$ may be equal to 0, if the number of PDSCH symbols allocated is L>=3 and L<=6, then $d_{1,1}$ may be equal to the number of overlapping symbols of the scheduling PDCCH and the scheduled PDSCH, if the number of PDSCH symbols allocated is 2, if the scheduling PDCCH was in a 3-symbol CORESET and the CORESET and the PDSCH had the same starting symbol then $d_{1,1}$ may be equal to 3, otherwise $d_{1,1}$ may be the number of overlapping symbols of the scheduling PDCCH and the scheduled PDSCH.

Tables below show processing times according to UE processing capability. Particularly, Table 10 shows a PDSCH processing time for PDSCH processing capability #1 of the UE, and Table 11 shows a PDSCH processing time for PDSCH processing capability #2 of the UE.

TABLE 10

| | PDSCH decoding time $N_1$ [symbols] | |
|---|---|---|
| u/SCS | Front-loaded DMRS only | Front-loaded + additional DMRS |
| 0/15 kHz | 8 | $N_{1,0}$ |
| 1/30 kHz | 10 | 13 |
| 2/60 kHz | 17 | 20 |
| 3/120 kHz | 20 | 24 |

TABLE 11

| u/SCS | PDSCH decoding time $N_1$ [symbols] |
|---|---|
| 0/15 kHz | 3 |
| 1/30 kHz | 4.5 |
| 2/60 kHz | 9 for frequency range 1 | which deferred HARQ-ACK is to be transmitted or the start of a slot in which SPS HARQ-ACK is deferred, the UE may disregard the received DCI or may not perform HARQ-ACK retransmission.

Alt. 2_2: As another example, Alt. 2_1 may be applied under the assumption that the processing time T is the following UL PUSCH preparation time used in DCI reception and PUSCH transmission processes defined in TS 38.214. In other words, if the first symbol in a PUCCH occurs within Tproc,2 based on the last symbol of a CORESET in which a DCI format indicating HARQ-ACK retransmission is detected, the UE does not expect that transmission of the deferred SPS HARQ-ACK PUCCH will be cancelled. If the first uplink symbol in the PUSCH allocation for a transport block, including the DM-RS, as defined by the slot offset $K_2$ and the start S and length L of the PUSCH allocation indicated by 'time domain resource assignment' of the scheduling DCI and including the effect of the timing advance, is no earlier than at symbol $L_2$, $L_2$ is defined as the next uplink symbol with its CP starting $T_{proc,2}=\max\{(N_2+d_{2,1}+d_2)*(2048+144)*\kappa*2^{-u}*T_c+T_{ext}+T_{switch}, d_{2,2}\}$ after the end of the reception of the last symbol of the PDCCH carrying the DCI scheduling the PUSCH, then the UE transmits the transport. $N_2$ is based on u of Table 12 and Table 13 for UE timing capabilities #1 and #2, respectively, and u is one of ($u_{DL}$, $U_{UL}$), that causes the largest T2, where $u_{DL}$ corresponds to a subcarrier spacing of a PDCCH carrying DCI for scheduling a PUSCH, $U_{UL}$ corresponds to a subcarrier spacing of the PUSCH, and $K=T_c/T_f=64$. For operation with shared spectrum channel access, $T_{ext}$ may be calculated according to section 5.3.1 of 3GPP TS 38.211, otherwise $T_{ext}$ may be equal to 0. If the first symbol of the PUSCH allocation consists of DM-RS only, then $d_{2,1}$ may be equal to 0, otherwise $d_{2,1}$ may be equal to 1. If the scheduling DCI triggered a switch of BWP, $d_{2,2}$ may be equal to the switching time, otherwise $d_{2,2}$ may be equal to 0. The switching time may be differently defined depending on a frequency range (FR). For example, the switching time may be defined as 0.5 ms for FR1 and as 0.25 ms for FR2 The switching time may be differently defined depending on a frequency range (FR). For example, the switching time may be defined as 0.5 ms for FR1 and as 0.25 ms for FR2. If a PUSCH of a larger priority index would overlap with PUCCH of a smaller priority index, $d_2$ for the PUSCH of a larger priority may be set as reported by the UE, otherwise $d_2$ may be equal to 0.

Tables below show processing times according to UE processing capability. In particular, Table 12 shows a PUSCH preparation time for PUSCH timing capability #1 of the UE, and Table 13 shows a PUSCH processing time for PUSCH timing capability #2 of the UE.

TABLE 12

| u/SCS | PUSCH preparation time $N_2$ [symbols] |
| --- | --- |
| 0/15 kHz | 10 |
| 1/30 kHz | 12 |
| 2/60 kHz | 23 |
| 3/120 kHz | 36 |

TABLE 13

| u/SCS | PUSCH preparation time $N_2$ [symbols] |
| --- | --- |
| 0/15 kHz | 5 |
| 1/30 kHz | 5.5 |
| 2/60 kHz | 11 for frequency range 1 |

If the deferred SPS HARQ-ACK PUCCH overlaps (in time) with one or more PUCCHs and/or PUSCHs, the UE and the BS may determine validity of a HARQ-ACK retransmission indication based on the earliest timing among timings that guarantee a minimum processing time of the overlapping PUCCHs and/or PUSCHs.

Figure 15:
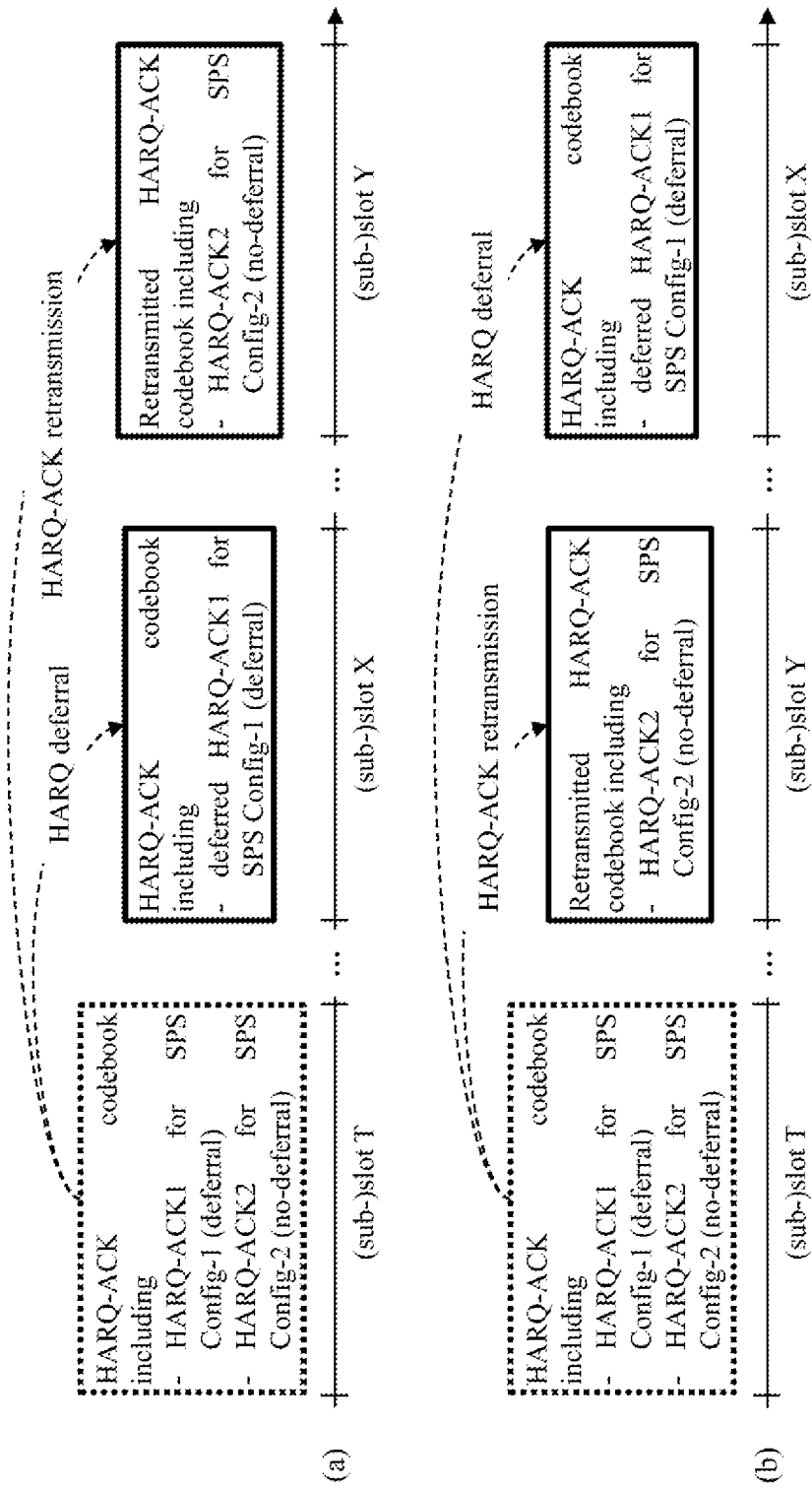
FIGS. 15 and 16 illustrate HARQ-ACK transmission according to some implementations of the present disclosure when HARQ-ACK deferral and HARQ-ACK retransmission are applied together.
Figure 16:
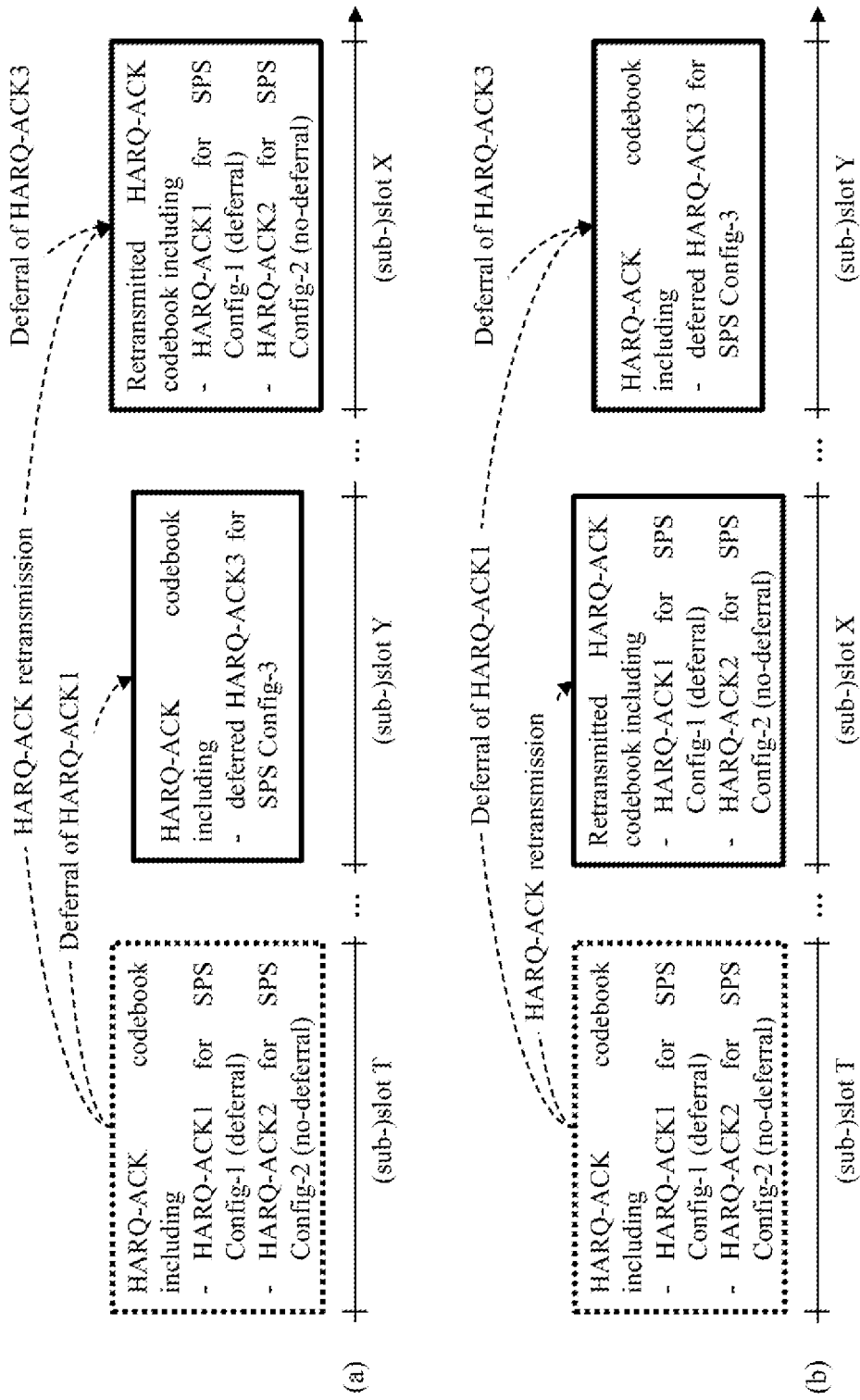

<Implementation 3> Exclusive Operation Between SPS HARQ-ACK Deferral and HARQ-ACK Retransmission FIGS. 15 and 16 illustrate HARQ-ACK transmission according to some implementations of the present disclosure when HARQ-ACK deferral and HARQ-ACK retransmission are applied together. While the case in which a (sub-)slot for transmission of HARQ-ACK deferred by HARQ-ACK deferral and a (sub-)slot in which HARQ-ACK transmission by a HARQ-ACK retransmission request will occur are different is illustrated in FIGS. 15 and 16, some implementations of the present disclosure may be applied even when the (sub-)slot for deferred HARQ-ACK transmission and the (sub-)slot in which HARQ-ACK transmission by the HARQ-ACK retransmission request will occur are the same.

When SPS HARQ-ACK of one or more (sub-)slots T is deferred to be transmitted in (sub-)slot X through the HARQ-ACK deferral operation described in Implementation 1 and retransmission of HARQ transmission (initially) scheduled in one (sub-)slot T through HARQ-ACK retransmission described above in Implementation 1 is performed in (sub-)slot X or Y (e.g., a HARQ-ACK codebook that has been transmitted or was indicated to be transmitted (i.e. would have been transmitted) in specific (sub-)slot T is indicated to be retransmitted in (sub-)slot X or another (sub-)slot Y corresponding to a transmission timing at which SPS HARQ-ACK is deferred to be transmitted), the UE may consider the following methods in order not to prevent each operation from transmitting redundant information.

Method 3_1: HARQ-ACK information of an SPS PDSCH may be excluded from the HARQ-ACK codebook transmitted through HARQ-ACK retransmission. In some implementations, upon performing HARQ-ACK retransmission, the UE may exclude HARQ-ACK information corresponding to SPS PDSCH reception or HARQ-ACK information corresponding to a HARQ process used for SPS PDSCH reception from the retransmitted HARQ-ACK codebook and transmit a codebook in which corresponding bit positions are emptied or a codebook filled with a value (e.g., '0') indicating NACK. Alternatively, when the retransmitted HARQ-ACK codebook is configured according to the Type-2 HARQ-ACK codebook construction method described in 3GPP TS 38.213, the ULE may transmit a reduced HARQ-ACK codebook by excluding a separately configured SPS HARQ-ACK codebook (i.e., SPS HARQ-ACK bit(s) that follow HARQ-ACK bits for dynamically scheduled PDSCH receptions). Method 3_1 may prevent the same HARQ-ACK information from being redundantly provided to the BS.

Method 3_1-1: In some implementations, when the HARQ-ACK information of the SPS PDSCH is excluded from the HARQ-ACK codebook retransmitted through HARQ-ACK retransmission, the excluded HARQ-ACK information may be limited to HARQ-ACK information of a PDSCH associated with an SPS configuration configured to use the SPS HARQ-ACK deferral operation. For example, HARQ-ACK information of a PDSCH associated with an SPS configuration that is not configured to use the SPS HARQ-ACK deferral operation may be transmitted while being included in the retransmitted HARQ-ACK codebook. Referring to FIG. 15, when transmission of a HARQ-ACK codebook including HARQ-ACK1 for SPS configuration-1 and HARQ-ACK2 for SPS configuration-2, scheduled to be transmitted in (sub-)slot T, overlaps DL symbols in (sub-)slot T, HARQ-ACK1 for SPS configuration-I for which HARQ deferral is configured may be deferred to be transmitted in another earliest (sub-)slot X in which HARQ-ACK1 may be transmitted. Upon receiving HARQ-ACK transmission triggering DCI that requests that a HARQ-ACK codebook that the UE transmitted or would transmit in (sub-)slot T be transmitted in (sub-)slot Y, the UE may not include HARQ-ACK1 of SPS configuration-1 for which HARQ deferral is configured in a HARQ-ACK codebook transmitted in a (sub-)slot based on the HARQ-ACK transmission triggering DCI and may include HARQ-ACK2 of SPS configuration-2 for which HARQ deferral is not configured therein.

Method 3_1-2: In some implementations, in using Method 3_1, Method 3_1 may be applied only when the retransmitted HARQ-ACK codebook includes only a Type-2 codebook described in 3GPP TS 38.213. In the case of the Type-2 HARQ-ACK codebook, since HARQ-ACK information for SPS PDSCH(s) is appended after other HARQ-ACK information bits, the UE and the BS may easily distinguish between the HARQ-ACK information for the SPS PDSCH(s) and other HARQ-ACK information.

Method 3_1-3: In some implementations, Method 31, Method 3_1 may be limitedly used when at least one of HARQ-ACK information of a PDSCH associated with an SPS configuration configured to use the SPS HARQ-ACK operation is included in the retransmitted HARQ-ACK codebook.

Method 3_1-4: In some implementations, whether to use Method 3_1 may be determined in consideration of a HARQ-ACK PUCCH resource of (sub-)slot T. As an example, Method 3_1 may be limitedly applied to the case in which a HARQ-ACK PUCCH of (sub-)slot T has not been transmitted due to overlap with a semi-statically configured DL symbol or a HARQ-ACK deferral operation was used therethrough. For example, the UE and the BS may determine whether to use Method 3_1 in consideration of at least one of the following methods.

Method 3_1 is used when the HARQ-ACK PUCCH of (sub-)slot T overlaps with the semi-statically configured DL symbol (e.g., a symbol, indicated as DL by RRC configuration tdd-UL-DL-ConfigurationCommon or tdd-UL-DL-ConfigDedicated, indicated as a symbol for an SS/PBCH block by RRS configuration ssb-PositionsInBurst, or belongs to a CORESET associated with a Type0-PDCCH CSS set for a PDSCH that schedules a PDSCH carrying remaining minimum system information (RMSI)).

Method 3_1 is used when the HARQ-ACK PUCCH of (sub-)slot T overlaps with the semi-statically configured DL symbol and at least one SPS configuration HARQ-ACK deferral operation among SPS configuration(s) associated with SPS PDSCH HARQ-ACK included in the HARQ-ACK PUCCH is configured.

Method 3_1 is used when the HARQ-ACK PUCCH of (sub-)slot T overlaps with the semi-statically configured DL symbol and the HARQ-ACK deferral operation is configured in all SPS configuration(s) associated with the SPS PDSCH HARQ-ACK included in the HARQ-ACK PUCCH.

Method 3_1 is used when the HARQ-ACK PUCCH of the (sub-)slot T overlaps with the semi-statically configured DL symbol and the corresponding HARQ-ACK PUCCH is used for SPS HARQ-ACK determined by SPS-PUCCH-AN-List or n1PUCCH-AN. Here, SPS-PUCCH-AN-List is an RRC parameter that indicates a list of PUCCH resources for SPS HARQ-ACK, and n1PUCCH-AN is an RRC parameter that provides PUCCH resources for SPS HARQ-ACK in an SPS configuration.

Method 3_1 is used only when the HARQ-ACK PUCCH of (sub-)slot T overlaps with the semi-statically configured DL symbol and the corresponding HARQ-ACK PUCCH is a PUCCH used for SPS HARQ-ACK determined by SPS-PUCCH-AN-List or n1PUCCH-AN. Here, SPS-PUCCH-AN-List is an RRC parameter that indicates a list of PUCCH resources for SPS HARQ-ACK, and n1PUCCH-AN is an RRC parameter that provides PUCCH resources for SPS HARQ-ACK in the SPS configuration.

Method 31 is used only when the HARQ-ACK PUCCH of the (sub-)slot T overlaps with the semi-statically configured DL symbol and the corresponding HARQ-ACK PUCCH is not a PUCCH resource determined by dynamic scheduling of the BS.

Method 3_1 is used only when the HARQ-ACK deferral operation is performed on the HARQ-ACK PUCCH of the (sub-)slot T.

Method 3_2: HARQ-ACK information of an SPS PDSCH transmitted by HARQ-ACK retransmission may be excluded from a HARQ-ACK codebook transmitted by HARQ-ACK deferral. For example, when the UE attempts to transmit an SPS HARQ-ACK codebook in (sub-)slot X by performing the HARQ-ACK deferral operation in one or more (sub-)slots, the UE may receive a retransmission indication of a HARQ-ACK codebook of any (sub-)slot T in which the HARQ-ACK deferral operation is performed and exclude SPS HARQ-ACK deferred in (sub-)slot T from a deferred SPS HARQ-ACK codebook to be transmitted in (sub-)slot X. For example, referring to FIG. 16, when a HARQ-ACK codebook that has been transmitted or was indicated to be transmitted (i.e. would have been transmitted) in specific (sub-)slot T is indicated to be retransmitted another (sub-)slot, and specific SPS HARQ-ACK transmission in specific (sub-)slot T is deferred to be transmitted in another (sub-)slot X, specific SPS HARQ-ACK (HARQ-ACK1 in FIG. 16) may be excluded from a (deferred) SPS HARQ-ACK codebook to be transmitted in (sub-)slot X. On the other hand, as illustrated in FIG. 16, specific SPS HARQ-ACK (HARQ-ACK1 in FIG. 16) may be included in a HARQ-ACK codebook to be retransmitted in (sub-)slot Y In the case of HARQ-ACK retransmission, in particular, in the case of one-shot codebook-based HARQ-ACK retransmission, according to Method 3_2, even if there is HARQ deferral, the UE only needs to transmit, in a (sub-)slot determined by HARQ-ACK transmission triggering DCI, a HARQ-ACK codebook that the UE transmitted or would transmit in a previous slot. Therefore, there is an advantage that the UE does not need to regenerate the HARQ-ACK codebook in consideration of HARQ deferral. In addition, when the retransmitted HARQ-ACK codebook is a Type-1 HARQ-ACK codebook, since it is difficult for the UE to distinguish which of HARQ-ACK information bits in a previously generated Type-1 HARQ-ACK codebook is for an SPS PDSCH, it is difficult to remove deferred HARQ-ACK upon generating a retransmission HARQ-ACK codebook. Therefore, Method 3_2 may easily prevent overlap with HARQ-ACK information provided to the BS by HARQ-ACK retransmission by including or excluding deferred HARQ-ACK to be transmitted in (sub-)slot X in or from a HARQ-ACK codebook to be transmitted in (sub-)slot X.

Method 3_3: When Implementation 1 or, similarly, HARQ-ACK retransmission is performed, all previously triggered HARQ-ACK deferral operations may be stopped. For example, when the UE receives a HARQ-ACK retransmission indication on a PDCCH of certain slot A, all HARQ-ACK deferral operations triggered before slot A or the last symbol of the PDCCH may be stopped, and all deferred HARQ-ACKs that have not been transmitted yet may be dropped. For example, when a HARQ-ACK codebook corresponding to the PUCCH, which has been transmitted or was indicated to be transmitted (i.e. would have been transmitted) in slot B, is indicated, through a PDCCH of slot A, to be retransmitted through a specific PUCCH of slot C, all HARQ-ACK deferral operations triggered before (or until) slot A, before (or until) the first/last symbol of the PDCCH, before (or until) slot C, or before (or until) the first/last symbol of the specific PUCCH are stopped and all deferred HARQ-ACKs that have not been transmitted yet may be dropped.

Method 3_3-1: In using Method 33, the UE may expect to receive a HARQ-ACK retransmission indication for all HARQ-ACK information included in a deferred HARQ-ACK codebook. In consideration of Method 3_3, i.e., in order to receive deferred and dropped SPS HARQ-ACK information, the BS may have to transmit one or more HARQ-ACK retransmission indications to the UE so that the UE may retransmit the deferred and dropped SPS HARQ-ACK information.

Method 3_3-2: In using Method 33, the UE may expect that a sufficient time will be guaranteed between the last symbol of the PDCCH and the start symbol of the PUCCH in which a deferred HARQ-ACK codebook is to be transmitted. In other words, when the BS indicates the UE to retransmit HARQ-ACK through a certain PDCCH, the BS may select a PDCCH occasion so that a sufficient processing time may be guaranteed between the last symbol of the PDCCH and the start symbol of the PUCCH on which a dropped and deferred HARQ-ACK codebook is to be transmitted by HARQ-ACK retransmission, and the UE may disregard a HARQ-ACK retransmission indication that does not guarantee the processing time.

Method 3_3-2: In using Method 3_3, when the received HARQ-ACK retransmission indication instructs the UE to retransmit a HARQ-ACK codebook of slot X in slot Y (X<Y), the UE may separately transmit the HARQ-ACK codebook in consideration of SPS HARQ-ACKs that fail to be transmitted before slot Y For example, when there is a time interval of a certain configuration value, i.e., K slot(s) or more, between a slot in which corresponding SPS HARQ-ACK among SPS HARQ-ACKs deferred before the retransmission indication has initially been scheduled and slot Y, the UE may perform separate HARQ-ACK transmission before slot Y by applying the HARQ-ACK deferral operation only to such SPS HARQ-ACK.

For example, when a HARQ-ACK codebook corresponding to the PUCCH, which has been transmitted or was indicated to be transmitted (i.e. would have been transmitted) in slot B, is indicated, by a PDCCH of slot A, to be retransmitted through a PUCCH of slot C, and a PUCCH transmission timing that is first indicated (before HARQ deferral is applied) with respect to SPS HARQ-ACK is slot X, Method 3_3 may be applied to corresponding SPS HARQ-ACK when a duration from slot X to slot C is equal to or less than a maximum deferral value which will be described below, and the HARQ-ACK deferral operation may be performed (without interruption) without applying Method 3_3 to a corresponding group of SPS HARQ-ACK information when the duration from slot X to slot C exceeds the maximum deferral value.

The configured value K may be the maximum deferral value applicable to the HARQ-ACK deferral operation. The maximum deferral value is a value indicating to how far slot SPS HARQ-ACK transmission may be deferred from an initially scheduled. If HARQ-ACK in the SPS HARQ-ACK deferral operation is not transmitted up to a slot farther than the number of slots of the maximum deferral value from the initially scheduled slot, the UE may drop corresponding HARQ-ACK information. For example, if the maximum deferral value is K1_max,def, when PUCCH transmission for SPS HARQ-ACK scheduled for transmission in slot X overlaps with a DL symbol and there is no slot that is available for SPS HAR-ACK transmission up to slot X+K1_max,def, transmission of SPS HARQ-ACK may be dropped. The maximum deferral value may be a predefined value or may be configured for each SPS configuration through higher layer signaling of the BS.

Alternatively, the configured value K may be an absolute value of a maximum or minimum value of the slot indication range of a HARQ-ACK retransmission operation. For example, when performing the HARQ-ACK retransmission operation, in order to indicate a HARQ-ACK codebook of a specific position, the BS may indicate an offset value between a slot in which the BS transmits a HARQ-ACK retransmission indication to the UE and a slot in which a codebook requiring retransmission is located. Such an offset value may be selected within a certain range which is predetermined or configured through higher layer signaling of the BS.

According to some implementations of the present disclosure, the UE may perform deferred HARQ-ACK transmission and HARQ-ACK retransmission in one slot. In addition, according to some implementations of the present disclosure, UL radio resources of a system may be conserved by allowing the UE to perform deferred HARQ-ACK transmission while excluding unnecessary HARQ-ACK transmission.

Figure 17:
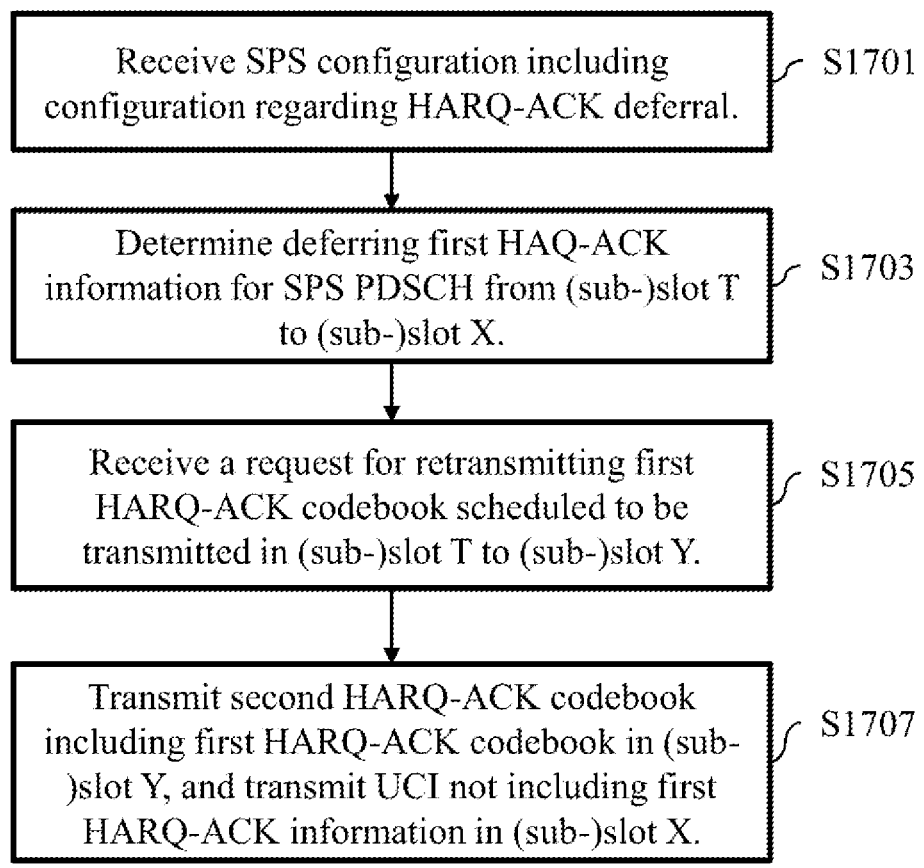
FIG. 17 illustrates a flow of HARQ-ACK information transmission at a UE according to some implementations of the present disclosure.

FIG. 17 illustrates a flow of HARQ-ACK information transmission at a UE according to some implementations of the present disclosure.

The UE may perform operations according to some implementations of the present disclosure in relation to HARQ-ACK transmission. The UE may include: at least one transceiver; at least one processor; and at least one computer memory operably connected to the at least one processor and configured to store instructions that, when executed, cause the at least one processor to perform the operations according to some implementations of the present disclosure. A processing device for a UE may include: at least one processor; and at least one computer memory operably connected to the at least one processor and configured to store instructions that, when executed, cause the at least one processor to perform the operations according to some implementations of the present disclosure. A computer-readable (non-transitory) storage medium may store at least one computer program including instructions that, when executed by at least one processor, cause the at least one processor to perform the operations according to some implementations of the present disclosure. A computer program or computer program product may include instructions stored on at least one computer-readable (non-volatile) storage medium and, when executed, cause (at least one processor) to perform the operations according to some implementations of the present disclosure.

For the UE, processing device, computer-readable (non-volatile) storage medium, and/or computer program product, the operations may include: determining to perform HARQ deferral for transmission of first HARQ-ACK information, based on transmission of the first HARQ-ACK information overlapping with a DL in a (sub-)slot T (S1703); determining a (sub-)slot X, which is a target slot, in which transmission of the first HARQ-ACK information is to be deferred by the HARQ deferral; receiving DCI triggering retransmission of a first HARQ-ACK codebook scheduled to be transmitted in the (sub-)slot T (S1705); determining a (sub-)slot Y for retransmission of the first HARQ-ACK codebook based on the DCI; transmitting a second HARQ-ACK codebook including the first HARQ-ACK codebook in the (sub-)slot Y (S1707); and transmitting UCI in the (sub-)slot X (S1707). In some implementations, the UCI does not include the first HARQ-ACK information, based on the second HARQ-ACK codebook including the first HARQ-ACK information.

In some implementations, the operations may further include receiving an SPS configuration including a configuration regarding the HARQ deferral. (S1701).

In some implementations, the first HARQ-ACK information may be HARQ-ACK information for an SPS PDSCH based on an SPS configuration in which the HARQ deferral is enabled.

In some implementations, the UCI may include second HARQ-ACK information, based on the second HARQ-ACK information, transmission of which is deferred to the (sub-)slot X from a slot different from the (sub-)slot T.

In some implementations, the second HARQ-ACK codebook may further include the second HARQ-ACK information after the first HARQ-ACK codebook, based on the (sub-)slot X being equal to the (sub-)slot Y.

Figure 18:
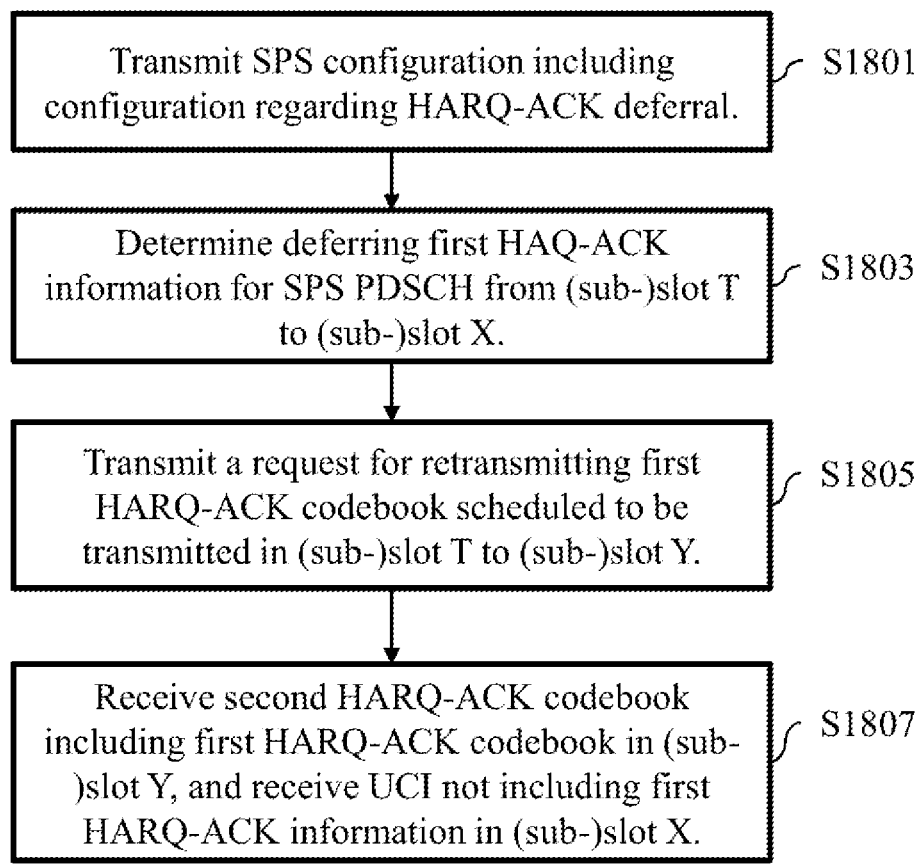
FIG. 18 illustrates a flow of HARQ-ACK information reception at a BS according to some implementations of the present disclosure.

FIG. 18 illustrates a flow of HARQ-ACK information reception at a BS according to some implementations of the present disclosure.

The BS may perform operations according to some implementations of the present disclosure in relation to HARQ-ACK reception. The BS may include: at least one transceiver; at least one processor; and at least one computer memory operably connected to the at least one processor and configured to store instructions that, when executed, cause the at least one processor to perform the operations according to some implementations of the present disclosure. A processing device for a BS may include: at least one processor; and at least one computer memory operably connected to the at least one processor and configured to store instructions that, when executed, cause the at least one processor to perform the operations according to some implementations of the present disclosure. A computer-readable (non-transitory) storage medium may store at least one computer program including instructions that, when executed by at least one processor, cause the at least one processor to perform the operations according to some implementations of the present disclosure. A computer program or computer program product may include instructions stored on at least one computer-readable (non-volatile) storage medium and, when executed, cause (at least one processor) to perform the operations according to some implementations of the present disclosure.

For the BS, processing device, computer-readable (non-volatile) storage medium, and/or computer program product, the operations may include: determining to perform HARQ deferral for transmission of first HARQ-ACK information, based on transmission of the first HARQ-ACK information overlapping with a DL in a (sub-)slot T (S1803); determining a (sub-)slot X, which is a target slot, in which transmission of the first HARQ-ACK information is to be deferred by the HARQ deferral; transmitting DCI triggering retransmission of a first HARQ-ACK codebook scheduled to be transmitted in the (sub-)slot T to a UE (S1805); determining a (sub-)slot Y for retransmission of the first HARQ-ACK codebook based on the DCI; receiving a second HARQ-ACK codebook including the first HARQ-ACK codebook in the (sub-)slot Y from the UE (S1807); and receiving UCI in the (sub-)slot X (S1807). In some implementations, the UCI does not include the first HARQ-ACK information, based on the second HARQ-ACK codebook including the first HARQ-ACK information.

In some implementations, the operations may further include providing an SPS configuration including a configuration regarding the HARQ deferral to the UE (S1801).

In some implementations, the first HARQ-ACK information may be HARQ-ACK information for an SPS PDSCH based on an SPS configuration in which the HARQ deferral is enabled.

In some implementations, the UCI may include second HARQ-ACK information, based on the second HARQ-ACK information, transmission of which is deferred to the (sub-)slot X from a slot different from the (sub-)slot T.

In some implementations, the second HARQ-ACK codebook may further include the second HARQ-ACK information after the first HARQ-ACK codebook, based on the (sub-)slot X being equal to the (sub-)slot Y.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

What is claimed is:

1. A method performed by a user equipment (UE) in a wireless communication system, the method comprising:
   determining to perform hybrid automatic repeat request (HARQ) deferral for transmission of first HARQ-acknowledgement (HARQ-ACK) information, based on transmission of the first HARQ-ACK information overlapping with a downlink symbol in a first slot;
   determining a target slot to which transmission of the first HARQ-ACK information is to be deferred by the HARQ deferral;
   receiving downlink control information triggering retransmission of a first HARQ-ACK codebook scheduled to be transmitted in the first slot;
   determining a second slot for retransmission of the first HARQ-ACK codebook based on the downlink control information;
   transmitting a second HARQ-ACK codebook including the first HARQ-ACK codebook in the second slot; and
   transmitting uplink control information in the target slot,
   wherein the uplink control information does not include the first HARQ-ACK information, and
   wherein the target slot is earlier than the second slot.

2. The method of claim 1, wherein the first HARQ-ACK information is HARQ-ACK information for a semi-persistent scheduling (SPS) physical downlink shared channel (PDSCH) based on an SPS configuration in which the HARQ deferral is enabled.

3. The method of claim 1, wherein the uplink control information includes second HARQ-ACK information, based on the second HARQ-ACK information, transmission of which is deferred to the target slot from a slot different from the first slot.

4. The method of claim 3, wherein the second HARQ-ACK codebook further includes the second HARQ-ACK information after the first HARQ-ACK codebook, based on the target slot being equal to the second slot.

5. A user equipment (UE) comprising:
    at least one transceiver;
        at least one processor; and
        at least one computer memory operably connectable to the at least one processor and configured to store instructions that, when executed, cause the at least one processor to perform operations comprising:
    determining to perform hybrid automatic repeat request (HARQ) deferral for transmission of first HARQ-acknowledgement (HARQ-ACK) information, based on transmission of the first HARQ-ACK information overlapping with a downlink symbol in a first slot;
    determining a target slot to which transmission of the first HARQ-ACK information is to be deferred by the HARQ deferral;
    receiving downlink control information triggering retransmission of a first HARQ-ACK codebook scheduled to be transmitted in the first slot;
    determining a second slot for retransmission of the first HARQ-ACK codebook based on the downlink control information;
    transmitting a second HARQ-ACK codebook including the first HARQ-ACK codebook in the second slot; and
    transmitting uplink control information in the target slot, and
    wherein the uplink control information does not include the first HARQ-ACK information, and
    wherein the target slot is earlier than the second slot.

6. The UE of claim 5, wherein the first HARQ-ACK information is HARQ-ACK information for a semi-persistent scheduling (SPS) physical downlink shared channel (PDSCH) based on an SPS configuration in which the HARQ deferral is enabled.

7. The UE of claim 5, wherein the uplink control information includes second HARQ-ACK information, based on the second HARQ-ACK information, transmission of which is deferred to the target slot from a slot different from the first slot.

8. The UE of claim 7, wherein the second HARQ-ACK codebook further includes the second HARQ-ACK information after the first HARQ-ACK codebook, based on the target slot being equal to the second slot.

9. A base station (BS) comprising:
    at least one transceiver;
    at least one processor; and
    at least one computer memory operably connected to the at least one processor and configured to store instructions that, when executed, cause the at least one processor to perform operations comprising:
    determining that hybrid automatic repeat request (HARQ) deferral for reception of first HARQ-acknowledgement (HARQ-ACK) information is performed, based on reception of the first HARQ-ACK information overlapping with a downlink symbol in a first slot;
    determining a target slot to which reception of the first HARQ-ACK information is to be deferred by the HARQ deferral;
    transmitting downlink control information triggering retransmission of a first HARQ-ACK codebook scheduled to be transmitted in the first slot to a user equipment (UE);
    determining a second slot for retransmission of the first HARQ-ACK codebook based on the downlink control information;
    receiving a second HARQ-ACK codebook including the first HARQ-ACK codebook in the second slot from the UE; and
    receiving uplink control information in the target slot from the UE,
    wherein the uplink control information does not include the first HARQ-ACK information, and
    wherein the target slot is earlier than the second slot.

10. The BS of claim 9, wherein the first HARQ-ACK information is HARQ-ACK information for a semi-persistent scheduling (SPS) physical downlink shared channel (PDSCH) based on an SPS configuration in which the HARQ deferral is enabled.

11. The BS of claim 9, wherein the uplink control information includes second HARQ-ACK information based on the second HARQ-ACK information, transmission of which is deferred to the target slot from a slot different from the first slot.

12. The BS of claim 11, wherein the second HARQ-ACK codebook further includes the second HARQ-ACK information after the first HARQ-ACK codebook, based on the target slot being equal to the second slot.

* * * * *